United States Patent
Baumann et al.

(10) Patent No.: US 6,758,117 B2
(45) Date of Patent: Jul. 6, 2004

(54) LATHE

(75) Inventors: Ulrich Baumann, Lenningen (DE); Werner Sonnek, Lichtenwald (DE)

(73) Assignee: Traub Drehmaschinen GmbH, Reichenbach (DE)

(*) Notice: Subject to any disclaimer, the term of this patent is extended or adjusted under 35 U.S.C. 154(b) by 0 days.

(21) Appl. No.: 09/963,883

(22) Filed: Sep. 25, 2001

(65) Prior Publication Data

US 2002/0066342 A1 Jun. 6, 2002

(30) Foreign Application Priority Data

Sep. 29, 2000 (DE) .......................................... 100 48 291

(51) Int. Cl.$^7$ .............................. B23B 9/00; B23B 3/34; B23B 7/04
(52) U.S. Cl. ................................ 82/117; 82/129; 29/36
(58) Field of Search .......................... 82/117, 118, 119, 82/120, 121, 123, 129, 131, 132, 133, 149; 489/235; 408/234; 29/27 C, 27 R, 36

(56) References Cited

U.S. PATENT DOCUMENTS

| | | | | |
|---|---|---|---|---|
| 3,199,386 A | * | 8/1965 | Deflandre ..................... | 82/149 |
| 3,534,643 A | * | 10/1970 | Markgraf ..................... | 82/149 |
| 4,208,930 A | * | 6/1980 | Hermann ..................... | 82/145 |
| 4,297,925 A | * | 11/1981 | Ishizuka et al. ............. | 82/120 |
| 4,457,193 A | * | 7/1984 | Matthey ....................... | 82/129 |
| 4,538,488 A | * | 9/1985 | Arvai .......................... | 82/149 |
| 4,545,271 A | * | 10/1985 | Romi .......................... | 82/149 |
| 4,800,790 A | * | 1/1989 | Hasz ........................... | 82/148 |
| 5,052,089 A | * | 10/1991 | Gadaud et al. ............... | 29/27 R |
| 5,127,140 A | * | 7/1992 | Oiwa et al. ................... | 29/27 C |
| 5,214,829 A | * | 6/1993 | Minagawa .................... | 29/27 C |
| 5,282,300 A | * | 2/1994 | Girny et al. .................. | 29/27 C |
| 5,293,793 A | * | 3/1994 | Hessbruggen et al. ......... | 82/121 |
| 5,313,694 A | * | 5/1994 | Yonemoto et al. ............. | 29/27 R |
| 5,555,178 A | * | 9/1996 | Hashimoto .................... | 700/175 |
| 5,946,992 A | * | 9/1999 | Ozawa ......................... | 82/48 |
| 6,016,729 A | * | 1/2000 | Pfeifer et al. ................ | 82/121 |
| 6,128,812 A | * | 10/2000 | Link et al. .................... | 29/40 |
| 6,311,591 B1 | * | 11/2001 | Grossmann ................... | 82/121 |
| 2001/0042424 A1 | * | 11/2001 | Sheehan et al. .............. | 82/121 |
| 2002/0014139 A1 | * | 2/2002 | Hirose et al. ................. | 82/118 |
| 2002/0020258 A1 | * | 2/2002 | Grossmann ................... | 82/121 |
| 2002/0033084 A1 | * | 3/2002 | Nakaminami et al. ........ | 82/120 |
| 2002/0053268 A1 | * | 5/2002 | Ueda et al. ................... | 82/129 |

FOREIGN PATENT DOCUMENTS

| | | | | |
|---|---|---|---|---|
| GB | 2215251 A | * | 9/1989 | ............ B23B/3/30 |
| JP | 09038803 A | * | 2/1997 | ........... B23B/17/00 |
| JP | 409038803 A | * | 2/1997 | |
| JP | 02002011601 A | * | 1/2002 | |
| JP | 02002011637 A | * | 1/2002 | |
| JP | 02002096237 A | * | 4/2002 | |

* cited by examiner

*Primary Examiner*—A. L. Wellington
*Assistant Examiner*—Brian D. Walsh
(74) *Attorney, Agent, or Firm*—Barry R. Lipsitz; Douglas M. McAllister

(57) ABSTRACT

The present invention provides a lathe, comprising a machine frame, a first working spindle with a first workpiece receiving means, at least one first tool slide with a tool carrier, a second working spindle with a second workpiece receiving means which faces the first workpiece receiving means, and at least one second tool slide with a tool carrier, The machine frame has an elongated machine base member, having a first support section and a second support section arranged to follow the first support section. Each support section has a base side, a spindle support side located opposite this and two slide support sides located opposite one another and between the base side and the spindle support side. The first working spindle is arranged on the spindle support side of the first support section and the second working spindle is arranged on the spindle support side of the second support section.

63 Claims, 13 Drawing Sheets

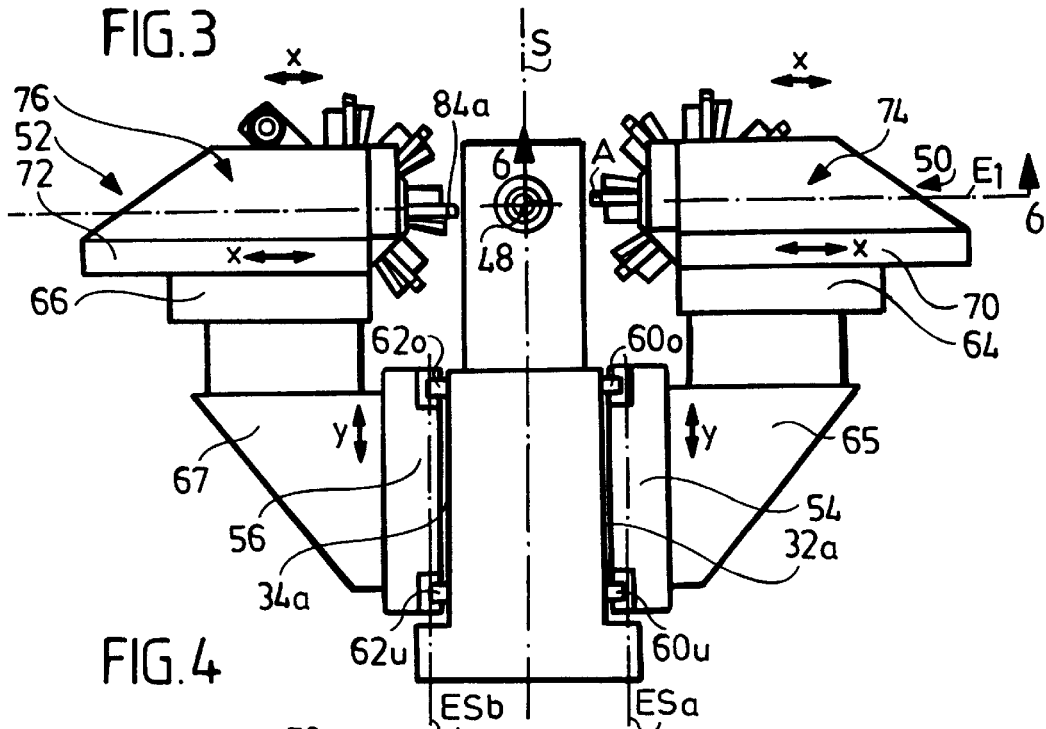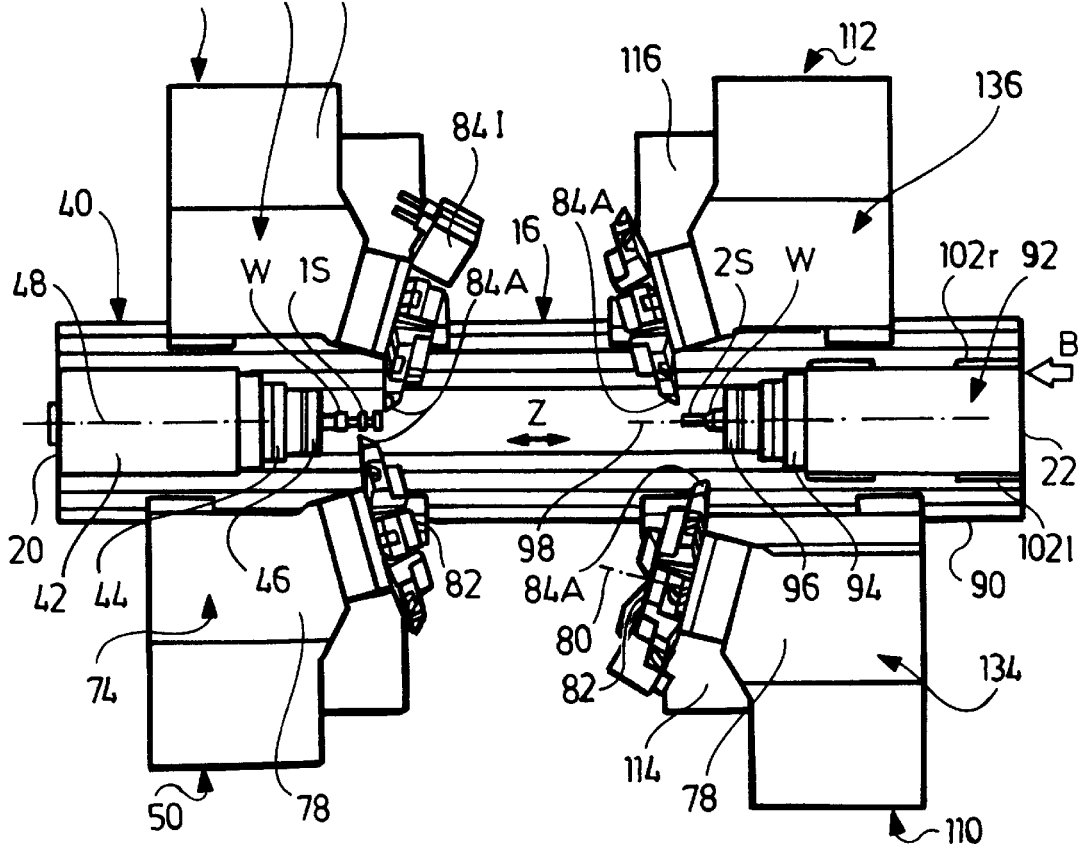

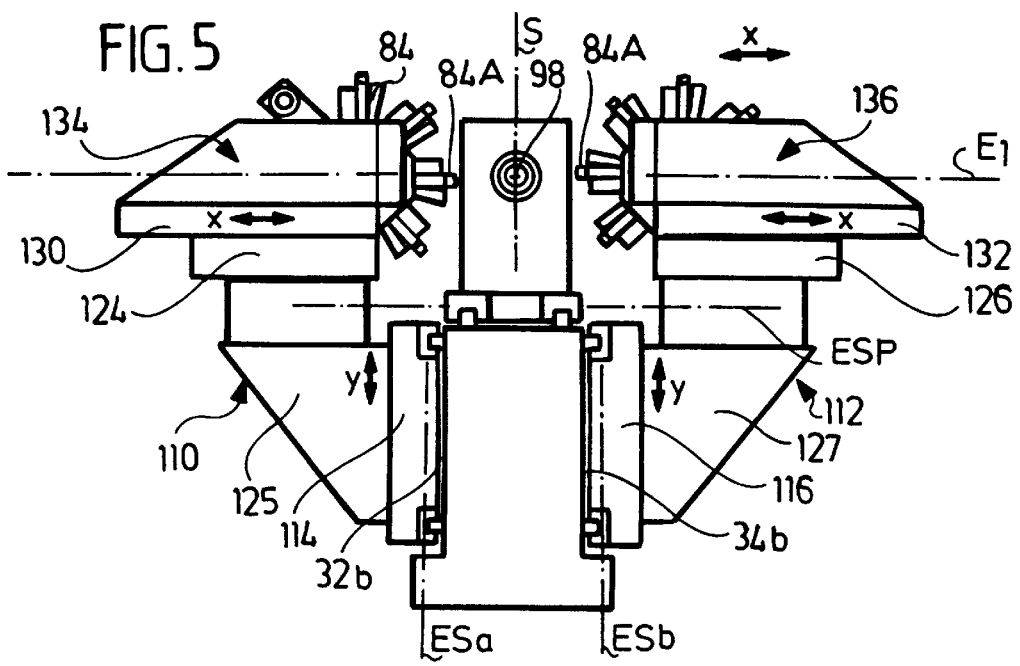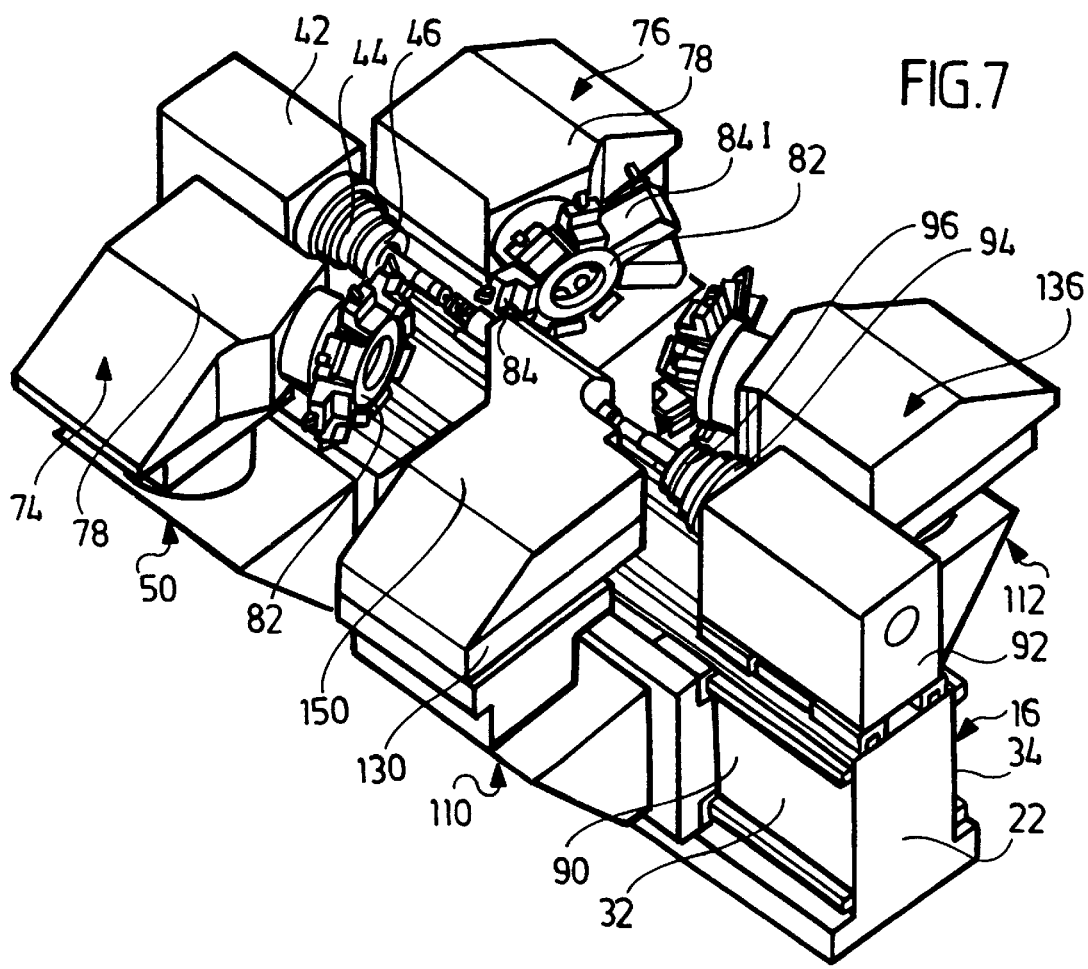

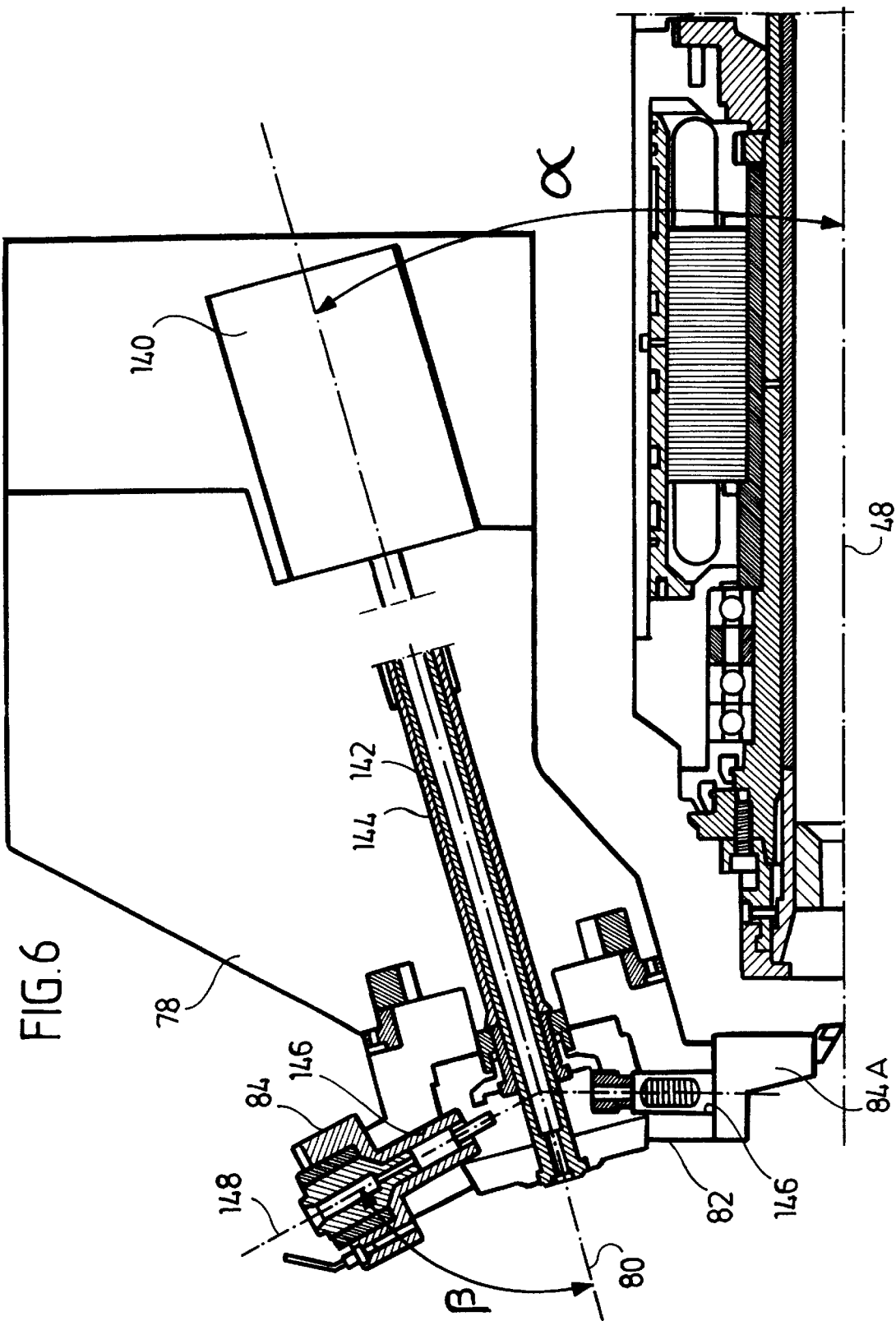

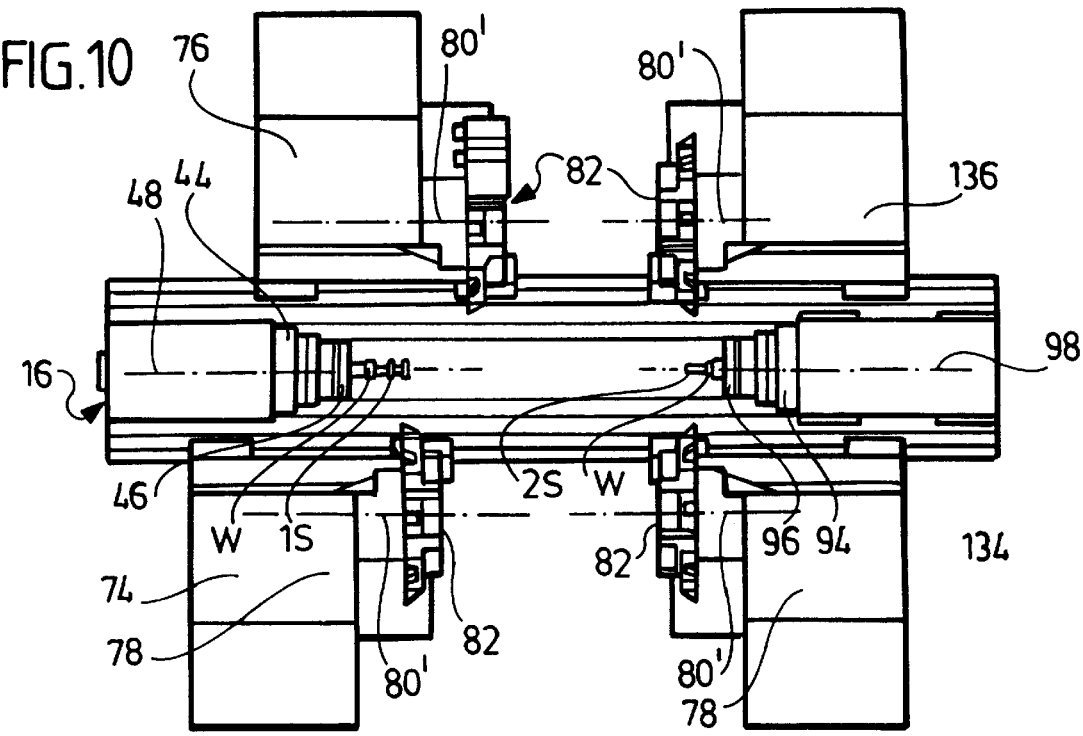
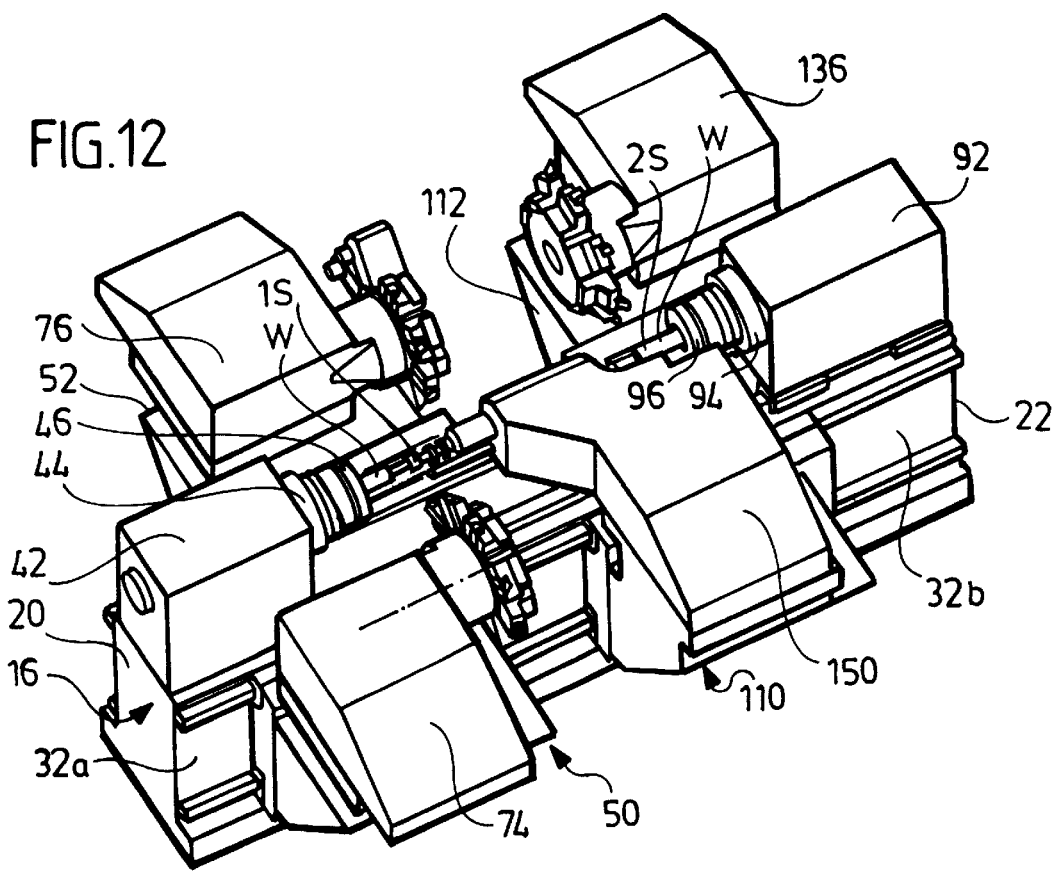

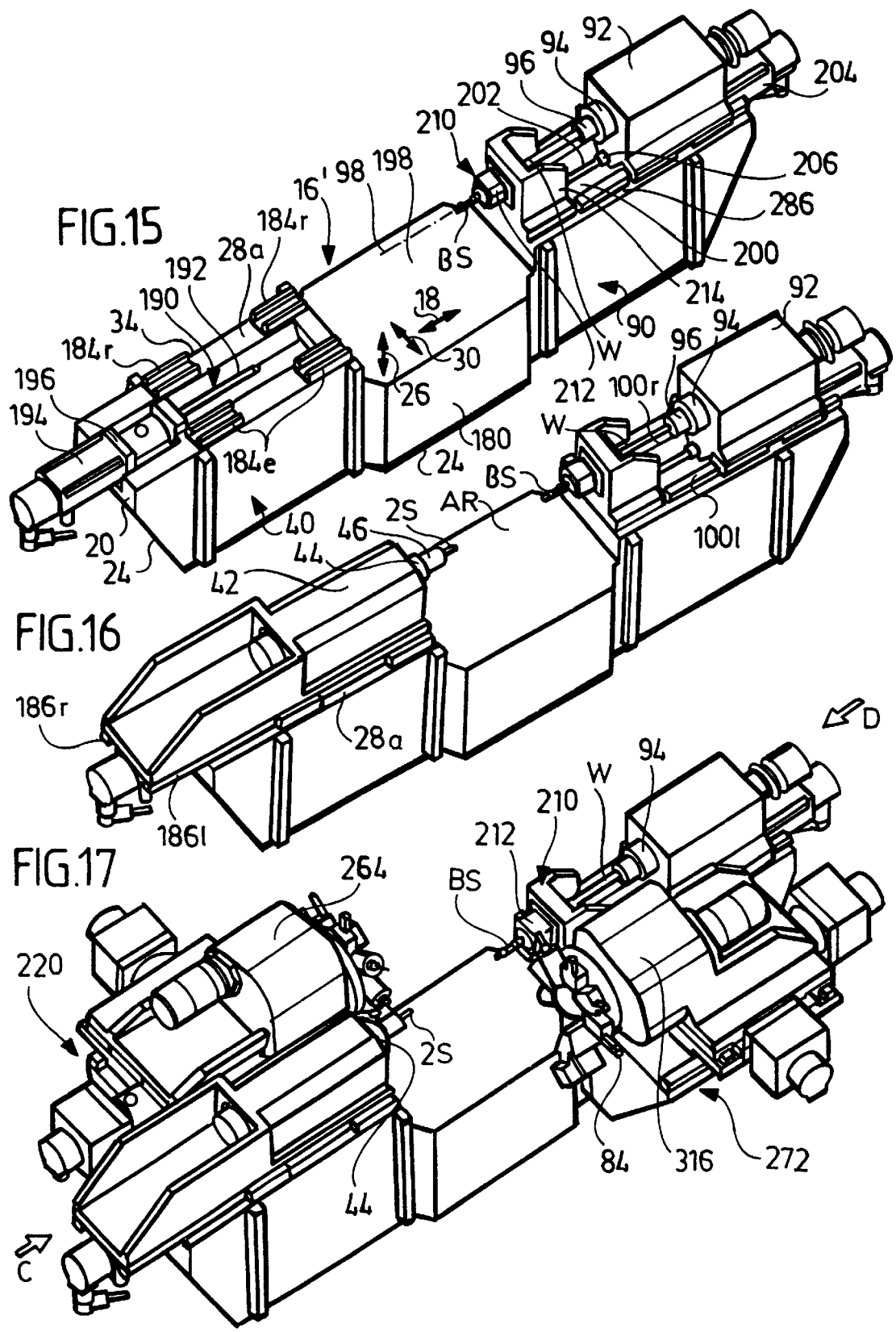

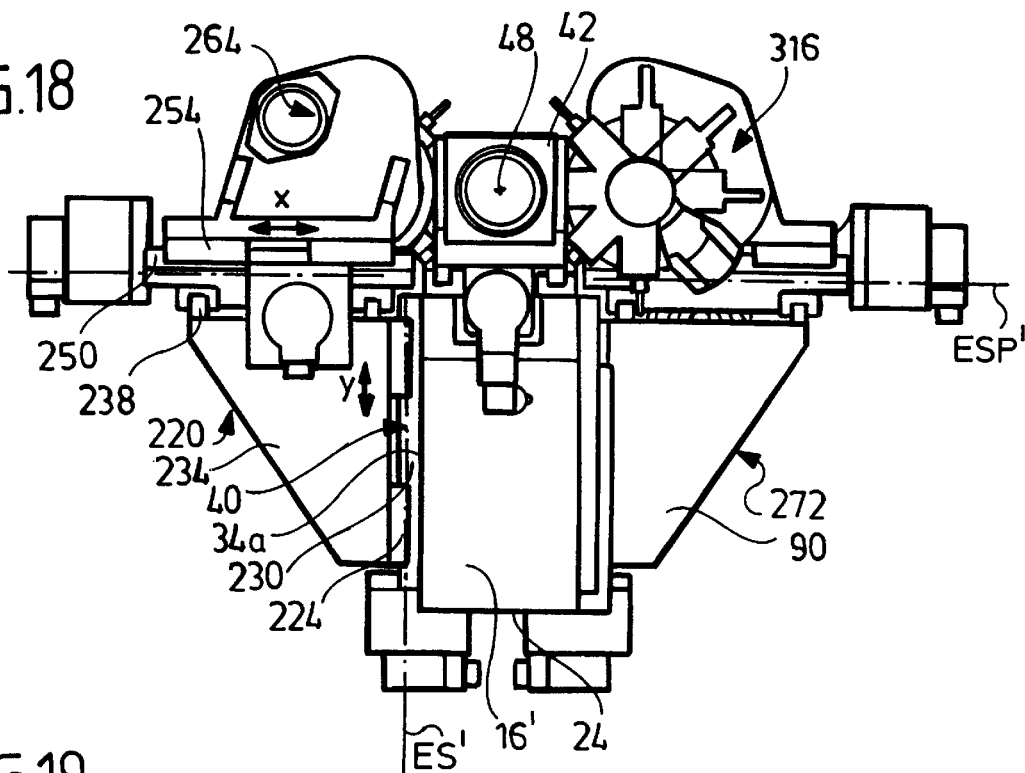
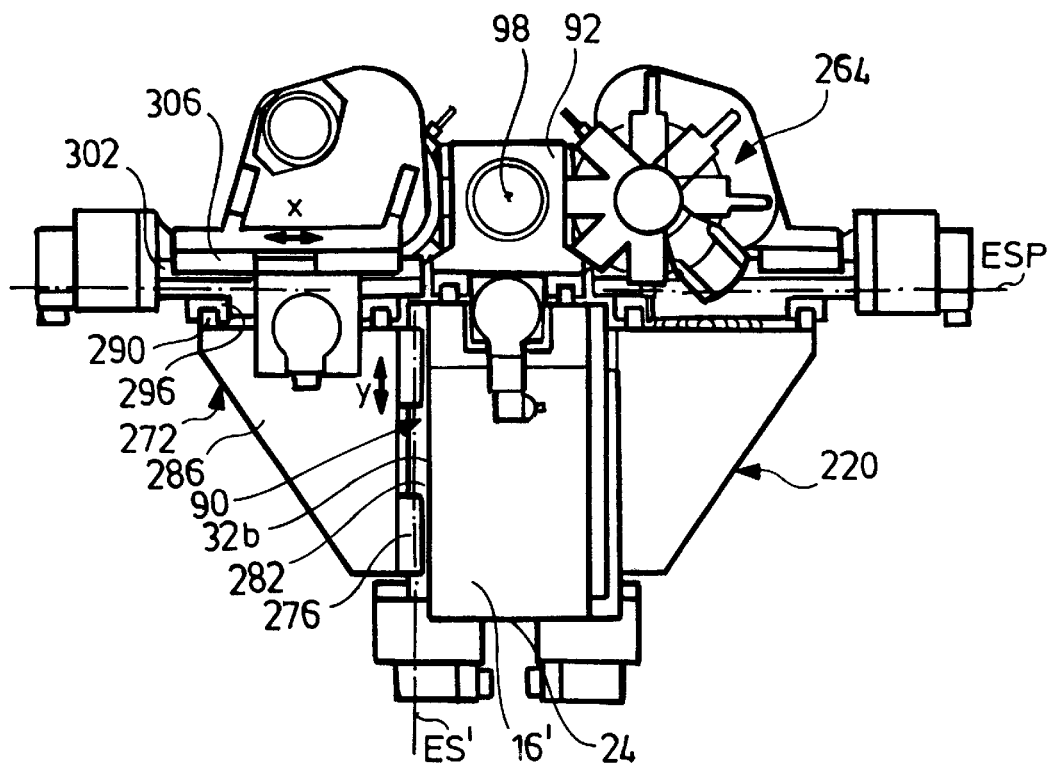

LATHE

The present disclosure relates to the subject matter disclosed in German Application No. 100 48 291.0 of Sep. 29, 2000, which is incorporated herein by reference in its entirety and for all purposes.

BACKGROUND OF THE INVENTION

The invention relates to a lathe comprising a machine frame arranged on a support surface, a first working spindle which is arranged on the machine frame, is drivable for rotation about a first spindle axis and has a first workpiece receiving means, at least one first tool slide, with which a tool carrier can be displaced in an X direction transversely to the first spindle axis so that a workpiece held in the first workpiece receiving means can be machined with at least one tool held on the tool carrier, a second working spindle which is arranged on the machine frame, is drivable for rotation about a second spindle axis and has a second workpiece receiving means which faces the first workpiece receiving means, at least one second tool slide, with which a tool carrier can be displaced in an X direction transversely to the second spindle axis so that a workpiece held in the second workpiece receiving means can be machined with at least one tool held on the tool carrier.

Lathes of this type are known from the state of the art as so-called counterspindle machines.

The problem with such counterspindle machines is to be seen in the fact that when as large a number of tools as possible is intended to be available for machining, in particular, as large a number of tools as possible is intended to be brought into engagement for the machining at the same time, these machines are of a very large construction.

The object underlying the invention is therefore to improve a lathe of the generic type in such a manner that this is of as compact a construction as possible.

SUMMARY OF THE INVENTION

This object is accomplished in accordance with the invention, in a lathe of the type described at the outset, in that the machine frame has a machine base member elongated in a longitudinal direction, that the machine base member has a first support section and a second support section arranged to follow this in the longitudinal direction, that each of the support sections has a base side, a spindle support side located opposite this in a first transverse direction in relation to the longitudinal direction and two slide support sides located opposite one another in a second transverse direction in relation to the longitudinal direction and between the base side and the spindle support side, that the first working spindle is arranged on the spindle support side of the first support section and the second working spindle is arranged on the spindle support side of the second support section and that the first tool slide is held on one of the slide support sides of the first support section and the second tool slide is held on one of the slide support sides of the second support section.

The advantage of the inventive solution is to be seen in the fact that with the use of such a machine base member a particularly space-saving type of construction of the inventive lathe has been developed.

Furthermore, such a machine base member has the advantage that with such an arrangement of working spindle and tool slide as well as tool carrier relative to one another this machine base member has a negative influence on the exactness of the rotary machining only to a slight degree with the heat expansion inherent in it since the heat expansion of the machine base member is slight in the transverse directions which are decisive for the exactness of the rotary machining and the expansion of the machine base member in the longitudinal direction is insignificant for the exactness of the respective rotary machining.

In this respect, a particularly favorable solution provides for the support sections to have essentially the same cross section so that the heat expansion in both support sections has the same effect and thus the relative exactness during the machining of the front and rear sides is very high since the heat expansion affects the exactness of the rotary machining in the same way in both support sections.

The machine base member could, in principle, be realized in the most varied of ways; for example, it is possible to construct the machine base member in a special profiled shape, for example, in a double T profile or in similar profiled shapes. A particularly favorable solution provides for the machine base member to extend like a beam in the longitudinal direction, wherein the beam-like shape is to be understood, in particular, such that the machine base member is designed on the basis of the beam-like basic shape.

With respect to the subdivision of the machine base member, it has merely been mentioned so far that this is intended to have two support sections.

In principle, it is possible to design the machine base member such that the support sections merge into one another.

A particularly favorable solution does, however, provide for a connecting section to be provided between the support sections.

Such a connecting section can, in the inventive solution, have essentially the same cross-sectional shape as the support sections.

It is, however, also possible when providing such a connecting section for this to have a cross-sectional shape different from the support sections.

Even when a connecting section is provided, the machine base member does, however, preferably form an integral part with the support sections and the connecting section.

With respect to the movability of the working spindles, no further details have so far been given in conjunction with the explanations concerning the individual embodiments. One advantageous embodiment, for example, provides for at least one of the support sections to have, on its spindle support side, guides means for a working spindle which is displaceable in Z direction parallel to the spindle axis, these guide means being located in a spindle guide plane, so that at least one of the working spindles can be moved in Z direction.

In this respect, the guide means are preferably located in a spindle guide plane extending parallel to the longitudinal direction.

In principle, it would be conceivable to mount the tool slides securely on the respective slide support sides of the machine base member.

However, since movability of the tools relative to the working spindle is necessary in any case, it is preferably provided for at least one of the tool slides to be guided so as to be movable on the machine base member with slide guide means located in a slide guide plane.

In this respect, the slide guide means preferably extend in slide guide planes extending parallel to the longitudinal direction.

With respect to the arrangement of the slide support sides relative to the spindle guide plane, it is particularly advantageous for reasons of space, especially to accommodate the tool slides in a space-saving manner, when the slide support sides of the machine base member are located on the same side of the spindle guide plane.

A particularly favorable geometry is present when the slide guide plane extends transversely to the spindle guide plane. It is even more favorable when the slide guide planes located opposite one another extend transversely to the spindle guide plane.

Such an extension of the slide guide plane transversely to the spindle guide plane includes all angles between these planes which are greater than 0°. The slide guide planes preferably extend at least at an angle of 45° to the spindle guide plane.

It is even better when the angle between the slide guide planes and the spindle guide plane is close to a right angle. A particularly expedient solution provides for the slide guide planes to extend approximately at right angles to the spindle guide plane.

In order to obtain as space-saving a construction of the inventive lathe as possible, it is particularly favorable for the machining of the respective workpiece when the corresponding tool slide and the corresponding working spindle are arranged on the same side of the respective tool located in working position in relation to this workpiece.

The compact mode of construction is benefited further when all the tool slides which can be used for the machining of the workpiece held in one of the workpiece receiving means are arranged, when seen in longitudinal direction of the machine base member, essentially on the same side of the tools borne by them and able to be brought into working position.

Furthermore, the compact mode of construction is benefited, in addition, when the tool slides associated with the respective support section are arranged on a side of the tools borne by them which faces away from the respectively other support section.

With respect to the number of tool slides, no further details have been given in conjunction with the preceding explanations concerning the individual embodiments. In principle, it is sufficient to associate one tool slide with each working spindle in order to be able to machine a workpiece with each of the working spindles at the same time and independently of one another.

However, a particularly favorable solution provides for two tool slides to be associated with at least one support section, these tool slides offering the possibility of machining at one working spindle with two tools which are in engagement.

With respect to the arrangement of the tool slides relative to the respective support section, it is particularly favorable when the tool slides on at least one of the support sections are designed to be in mirror symmetry to a mirror plane. This solution has the great advantage that with it the production of the tool slides is very simple since a large proportion of identical parts or parts which merely have to be produced in mirror image can be used on account of the mirror symmetry.

It is even more advantageous for reasons of cost when a tool slide of the one support section is of an identical design to a tool slide of the other support section since, as a result, the number of identical parts can be increased even further and thus the costs reduced even further.

A particularly inexpensive solution with respect to the construction of the tool slides provides, in the case of two tool slides respectively associated with each working spindle, for two tool slides to be of an identical design and for the other two tool slides to likewise be identical to one another but designed so as to be in mirror symmetry to the other tool slides so that the optimum number of identical parts or parts merely different due to mirror symmetry can be achieved and thus a high reduction in costs occurs during the production of the inventive machine tool.

It is particularly favorable when the tool slides designed to be identical to one another are arranged on different slide support sides of the machine base member in order to be able to utilize the advantages of the alignment of the tool slides relative to the tools with respect to a compact construction of the inventive lathe.

With respect to the movability of the tool slides, no further details have been given in conjunction with the preceding explanations concerning the individual embodiments. One advantageous embodiment, for example, provides for at least one of the two tool slides associated with one of the working spindles to have a slide member movable in Z direction. This solution has the advantage that, as a result, the possibility of machining with two tools engaging on one workpiece at the same time is improved further since, for example, in the case of a relative movement in Z direction between tool and working spindle which is required for the machining with one tool a second movability in Z direction is present, in addition, due to the slide member of the other tool slide which is movable in Z direction and so both tools can be used with different relative movements in Z direction.

With respect to the arrangement of the slide guide means in longitudinal direction of the machine base member, the most varied of possibilities are conceivable. A particularly favorable solution provides for the slide guide means for the at least one tool slide to be respectively provided in the area of the support sections on the slide support sides.

It is particularly favorable when the slide guide means are arranged outside a longitudinal section of the machine base member, in which a working space is located, in which machining of the workpieces held in the two working spindles takes place.

With respect to the movement of the tool slides relative to the machine base member in the area of the slide support sides, no further details have been given in conjunction with the preceding explanations of the individual embodiments. One advantageous embodiment, for example, provides for the tool slides to be guided on the slide support sides of the machine base member so as to be movable in Z direction.

This solution has the great advantage that a very stable guidance of the tool slides relative to the machine base member can be realized, in particular, when large movements in Z direction are intended to take place.

This may be realized in a particularly favorable manner in that Z guide means for the movable guidance of the respective tool slide are provided on at least one slide support side.

Since Z guide means are generally provided on both support sections, the Z guide means are preferably arranged such that the Z guide means of the one slide support side of one support section are aligned with Z guide means of the same slide support side of the other support section.

It is particularly favorable when the Z guide means of the slide support sides of both support sections merge into one another so that, in principle, it is possible to have the tool slides traveling from one support section to the other.

In this respect, it would, for example, be possible to associate a tool slide not only with one working spindle but also with the other working spindle for the machining of the workpiece so that the flexibility can be increased during use of such a lathe for workpieces of different types.

Even when a connecting section is provided between the support sections, one advantageous embodiment provides for the Z guide means to extend beyond the connecting section and thus to extend continuously from the one support section to the other support section.

Alternatively to the solution, with which the movability in Z direction takes place between the machine base member and the tool slide held thereon, a different solution provides for at least one of the tool slides to comprise a Y slide member which is guided on the slide support side of the machine base member so as to be movable in Y direction.

This solution has the advantage that with it the Y axis, which is the axis used the least dynamically, is seated as close as possible to the machine base member and the X axis and, where applicable, also a Z axis, which are intended to be drivable with dynamics which are as great as possible, are integrated into the tool slide and the axes, which are intended to be driven with great dynamics, have masses which are as low as possible and thus a mass inertia which is as low as possible.

In this respect, it is preferably provided for Y guide means for the movable guidance of the respective tool slide to be provided on at least one slide support side.

It is particularly favorable with this design of the tool slide when at least one of the tool slides comprises a Z slide member which is movable in Z direction in relation to the Y slide member guided on the slide support side so that a movement in Z direction can also be realized but this movability is realized by the tool slide itself and so only slight masses still have to be moved by the Z axis drivable with dynamics which are as great as possible.

In order to likewise have as little moved mass as possible in the X axis used mainly for a rotary machining, it is preferably provided for each tool slide to comprise an X slide member which is guided for movement in X direction in relation to a slide member guided on the slide support side.

In conjunction with the preceding explanations concerning the individual embodiments it has merely been described how as space-saving a construction of the lathe as possible can be achieved by way of favorable arrangement of the tool slides.

In order to continue this procedure in a consistent manner, it is advantageously provided, for the machining of the respective workpiece, for the corresponding tool carrier and the corresponding workpiece receiving means, when seen in longitudinal direction of the machine base member, to be arranged essentially on the same side of the respective tool located in working position in relation to this workpiece.

Furthermore, it is favorable for a compact mode of construction when all the tool carriers which can be used for the machining of the workpiece held in one of the workpiece receiving means are, when seen in longitudinal direction of the machine base member, arranged essentially on the same side of the tools which can be brought into working position.

Furthermore, the compactness of the construction may also be advantageously achieved due to the fact that the tool carriers associated with the respective support section extend essentially in the direction of a side of the respective tools borne by it which faces away from the respectively other support section.

With respect to the number of tool carriers it is favorable, when as large a number of tools as possible is intended to engage on the workpiece, when two tool carriers are associated with at least one of the working spindles.

In order to obtain as large a number of identical parts as possible, the tool carriers are preferably designed such that they are constructed on a least one of the carrier sections so as to be in mirror symmetry to a mirror plane.

Such a mirror symmetrical construction of the tool carriers already allows the use of a large number of identical parts, in particular in the case of the rotary parts, and the parts to be designed in mirror symmetry can also be produced simply and inexpensively from a technical point of view.

The number of identical parts may be kept particularly high when a tool carrier of one support section is of an identical design to the tool carrier of the other support section since, as a result, the identical parts are used for the two tool carriers and thus a considerable reduction in costs is possible.

In order to combine the advantages of an inexpensive construction with as space-saving a construction as possible, it is preferably provided for the tool carriers which are of an identical design to one another to be arranged on different slide support sides of the machine base member.

In the case of a lathe with two working spindles and two tool carriers respectively associated with each working spindle, in particular, a particularly favorable solution provides for altogether two tool carriers to be of an identical design and for the other two tool carriers to be in mirror symmetry to them so that the number of identical parts is maximized.

With respect to the design of the tool carriers themselves, no further details have so far been given.

It is, for example, conceivable to provide a tool carrier which bears a single tool.

It is particularly favorable in order to keep the number of usable tools as high as possible when the tool carriers are designed as multiple tool carriers.

Such a multiple tool carrier could, for example, be a linear tool carrier.

Another solution provides for a double linear tool carrier pivotable, in addition, about an axis to be provided as multiple tool carrier.

A particularly favorable solution provides, however, for at least one of the tool carriers to be designed as a tool turret.

Such a design of a tool turret creates the possibility of making a large number of tools available for use.

In order to keep such a tool turret as slight as possible with respect to its radial extension and thus be able to position a turret housing as close as possible to the spindle during the machining of the workpiece, it is preferably provided for the turret to have a turret axis extending at an angle of less than 45° to the respective spindle axis.

One possibility for realizing this would be for the turret axis to extend essentially parallel to the spindle axis.

This solution does, however, make it necessary, in particular, in the case of driven tools to separate the drive for the tools and the drive for the indexing of the turret for reasons of space when the diameter of the turret head is intended to be kept as small as possible and thus the turret axis is intended to be positioned as close as possible to the working spindle during the machining of the workpiece.

A particularly favorable solution provides, in this respect, for the turret axis to extend in an angular range of approximately 10° to approximately 30° in relation to the respective spindle axis so that it is possible on account of the inclined extension of the turret axis in relation to the spindle axis to provide the drive for driven tools and for the indexing of the turret coaxially to the turret axis.

In principle, it is conceivable within the scope of the inventive solution to arrange only tool carriers on the tool slides.

It is, however, also conceivable to provide on the tool slides auxiliary devices which are likewise considered within the scope of the present invention to be tools in the broadest sense.

One advantageous embodiment of an inventive lathe therefore provides for one of the tool slides to bear an element carrier for elements usable on the workpiece which creates the possibility of acting on one of the workpieces, in addition, during the machining.

The most varied of possibilities are conceivable as elements of the element carrier. For example, elements of the element carrier can be workpiece clamping elements or workpiece holding elements.

One particularly advantageous embodiment provides for the element carrier to bear a workpiece support element as element, with which an additional support of the respective workpiece during the machining is, for example, possible in order to either be able to machine more precisely or to be able to work with greater cutting forces.

In the simplest case, the workpiece support element is a center for supporting the workpiece; it is, however, also conceivable to provide any type of workpiece receiving means for supporting the workpiece instead of the center.

Alternatively or in addition to the provision of a workpiece support element it is preferably provided for the element carrier to bear a tool as element so that additional machinings are, for example, possible.

One advantageous embodiment provides for the element carrier to have not only workpiece clamping elements and/or workpiece guide elements and/or workpiece support elements but also tools and for different elements to be brought into use on the workpiece due to suitable movement of the element carrier relative to the workpiece.

In this respect, the most varied of solutions are conceivable in order to arrange the elements in a suitable manner.

It is particularly favorable when the elements are located with their central axes in a plane, preferably at a distance from one another, so that by arranging the plane such that this extends through the respective spindle axis of the workpiece the most varied of elements can be brought into use.

A solution which is particularly favorable for reasons of collision provides for the plane to extend parallel to the Y axis so that by displacing the element carrier in the direction of the Y axis the most varied of elements, i.e. workpiece clamping elements or workpiece guide elements or workpiece support elements or tools, can be positioned such that action on the workpiece can be realized with one of them.

It is particularly favorable when the element carrier has receiving means for the workpiece accommodated in the first workpiece receiving means and the second workpiece receiving means and thus the two workpieces can be supported at the same time by the element carrier.

In order to be able to machine a workpiece on both sides with the inventive machine tool as efficiently as possible, it is advantageously provided for at least one of the working spindles to be displaceable in Z direction to such an extent in the direction of the other working spindle that the workpiece can be transferred from one workpiece receiving means to the other workpiece receiving means.

With respect to the arrangement of the guide means for the working spindle displaceable in Z direction, it is preferably provided for these to each be arranged in the area of the support sections and, nevertheless, for the working spindle to be movable as far as the other working spindle to take over the workpiece.

In this respect it is particularly favorable when the guide means are arranged outside a longitudinal section of the machine base member, in which a working space is located, so that there is no necessity to guide these guide means through the working space.

In conjunction with the preceding explanations concerning the individual embodiments no further details have been given concerning the type of machining of the workpieces.

A customary machining of a workpiece which is held in a workpiece receiving means of the working spindle has merely be presupposed.

The inventive solution may, however, also be used particularly advantageously when a guiding device for longitudinal turning is associated with one of the working spindles so that the inventive lathe can operate as a special long-turning lathe.

In this respect, the working spindle can preferably be moved in Z direction relative to the guiding device in order to guide the workpiece through the guiding device, wherein machining takes place each time close to the guiding device by means of the tools held by the tool carriers.

In this respect, it is particularly favorable when the working spindle is guided on Z guide means arranged on the spindle support side of the support section.

In principle, it would be conceivable to configure the guiding device so as to also be movable in Z direction. For reasons of the simplicity of the construction and the precision of the machining it is, however, favorable when the guiding device is held stationary on the support section.

With respect to the movability of the other oppositely located working spindle, no particular details have been given in this respect. However, in order to likewise be able to provide for a transfer of the workpiece for machining on the second side, the oppositely located working spindle is preferably movable in Z direction relative to the support section and, in particular, displaceable to such an extent that its workpiece receiving means reaches the guiding device.

Additional features and advantages of the inventive solution are the subject matter of the following description as well as the drawings illustrating several embodiments.

BRIEF DESCRIPTION OF THE DRAWINGS

FIG. 3 shows a view in the direction of arrow A in FIG. 2;

FIG. 4 shows a plan view from above of the first embodiment of the inventive lathe with two spindles and two tool slides and tool carriers associated with each spindle;

FIG. 5 shows a plan view in the direction of arrow B in FIG. 4;

FIG. 6 shows a section along line 6—6 in FIG. 3;

FIG. 7 shows a perspective overall view of a second embodiment of an inventive lathe, with which in contrast to the first embodiment one tool carrier is replaced by a headstock;

FIG. 10 shows a plan view similar to FIG. 4 of a third embodiment of an inventive lathe, with which turrets with turret axes extending parallel to spindle axes are used;

FIG. 12 shows a perspective overall view of a fourth embodiment of an inventive lathe, with which in contrast to the third embodiment one tool carrier is replaced by a headstock;

FIG. 15 shows a perspective view of the machine base member with one working spindle of a sixth embodiment of an inventive lathe;

FIG. 16 shows a perspective illustration of the machine base member with two working spindles of the sixth embodiment;

FIG. 17 shows a perspective overall illustration of the sixth embodiment of the inventive lathe;

FIG. 18 shows a plan view in the direction of arrow C in FIG. 17;

FIG. 19 shows a plan view in the direction of arrow D in FIG. 17;

DETAILED DESCRIPTION OF THE INVENTION

Figure 1:
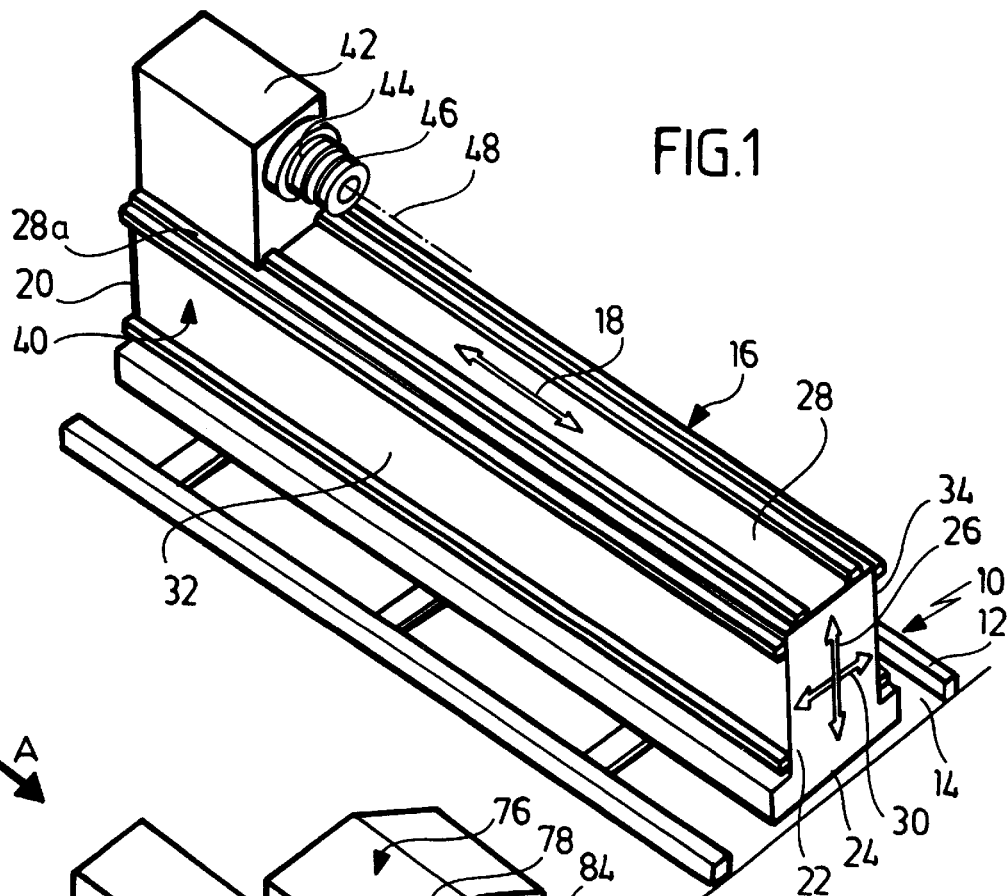
FIG. 1 shows a perspective view of a machine frame with machine base member and one spindle of a first embodiment of an inventive lathe.

A first embodiment of an inventive lathe, illustrated in FIG. 1, comprises a machine frame designated as a whole as 10 with a base frame 12 which can be placed on a support surface 14 for the machine frame and with a machine base member 16 borne by the base frame 12.

The machine base member 16 is thereby designed to be elongated like a beam in a longitudinal direction 18 and extend from a first end 20 as far as a second end 22 with an essentially constant cross section.

The machine base member 16 can be optionally arranged relative to the base frame 12, for example, so as to extend with the longitudinal direction 18 transversely or at right angles to the support surface 14 or also to extend approximately parallel to the support surface 14, wherein, in the last case, the machine base member 16 can be arranged so as to be suspended on the base frame 12 or to stand on it.

The machine base member 16 has, for its part, a base side 24, with which the machine base member 16 is placed, for example, on the base frame 12 and fixed in place on it, and a spindle support side 28 located opposite in a first transverse direction 26 in relation to the longitudinal direction 18. Furthermore, the machine base member 16 has two slide support sides 32 and 34 located opposite one another in a second transverse direction 30, wherein the second transverse direction 30 to the longitudinal direction 18 extends preferably at right angles to the first transverse direction 26.

In the first embodiment illustrated, the first transverse direction 26 extends approximately at right angles to the support surface 14 but it is also possible to arrange the first transverse direction 26 so as to extend at an angle or parallel to the support surface 14.

The machine base member 16 comprises, in addition, a first support section 40 which extends in the direction of the second end 22 proceeding from the first end 20.

The first support section 40 bears on its spindle support side 28a a spindle housing 42 of a first working spindle 44 which is provided with a first workpiece receiving means 46 and is rotatable about a first spindle axis 48.

In this respect, the spindle housing 42 is preferably arranged so as to be stationary on the spindle support side 28a of the first support section 40.

Figure 2:
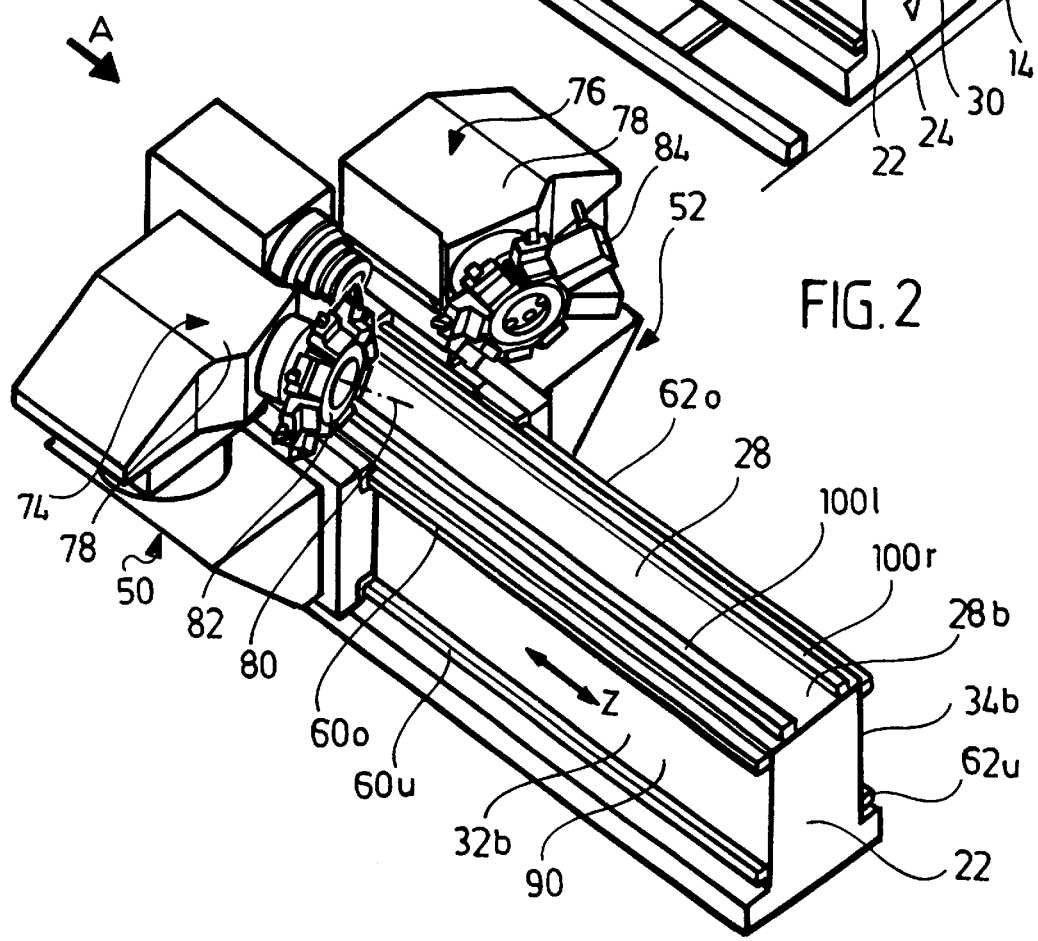
FIG. 2 shows a perspective view similar to FIG. 1 of the first embodiment with two tool slides with tool carriers associated with the working spindle.

A respective tool slide 50 and 52 is provided on the first support section 40, in addition, as illustrated in FIGS. 2 and 3, in the area of the slide support sides 32a and 34a, wherein both tool slides 50 and 52 have a Z slide member 54 and 56, respectively, which faces the slide support sides 32a and 34a of the first support section 40 and is guided on Z guide means 60o and 60u as well as 62o and 62u, respectively, which extend essentially parallel to the longitudinal direction 18 and are arranged on the slide support sides 32a and 34a at a distance from one another in the first transverse direction 26.

Respective slide guide planes ESa and ESb (FIGS. 3, 5) are defined by the Z guide means 60o, 60u and 62o, 62u and the Z slide members 54 and 56 can be moved parallel to the respective planes relative to the machine base member 16.

In the first embodiment illustrated, the slide guide planes ESa, ESb extend parallel to one another but can also extend at any optional angles to one another, wherein these angles are preferably smaller than 120°, even better smaller than 90°.

In general, the Z direction of an inventive lathe extends parallel to the spindle axis 48 and preferably also parallel to the longitudinal direction 18.

X guide members 64 and 66 are connected to the Z slide members 54 and 56 and X slide members 70 and 72, which can each be moved in an X direction at right angles to the spindle axis 48 in relation to the X guide members 64 and 66, are arranged on these X guide members.

The X slide members 70 and 72 bear, for their part, tool carriers which are designated as a whole as 74 and 76 and are preferably designed as tool turrets, of which each has a turret housing 78 held securely on the respective X slide member 70 and 72 and a turret head 82 which is rotatable about a turret axis 80 in relation to the turret housing 78 and bears a plurality of tools 84 which, when they are in a working position A, are located in a plane $E_1$ extending through the first spindle axis 48 and can be moved in this working position in X direction relative to the first spindle axis 48 in order to machine a workpiece W held in the first workpiece receiving means 46, as illustrated in FIG. 4.

The machine base member 16 has, in addition, a second support section 90 which extends in the direction of the first end 20 proceeding from the second end 22 and the spindle support side 28b of which bears a spindle housing 92 of a second working spindle 94 which, for its part, is provided with a second workpiece receiving means 96 and is rotatable about a second spindle axis 98 which extends coaxially to the first spindle axis 48.

In contrast to the first spindle housing 42, the second spindle housing 92 is displaceable in Z direction relative to the second support section 90 and, for this purpose, the spindle support side 28b of the second support section 90 bears two Z guide means 100l and 100r which are arranged at a distance from one another in the second transverse direction 30 and extend from the second support section 90 as far as the first working spindle 44 so that the second working spindle 94 can be displaced with the second workpiece receiving means 96 to such an extent in the direction of the first working spindle 44 that the workpiece W can be transferred directly from the first workpiece receiving means 46 to the second workpiece receiving means 96.

In this respect, the second spindle housing 92 is preferably guided on the Z guide means 100l and 100r via guide members 102l, 102r which are provided on the second spindle housing 92 and, for their part, are guided on the Z guide means 100l and 100r.

The Z guide means 100l and 100r define a spindle guide plane ESP (FIG. 5) which extends transversely to the slide guide planes ESa, ESb, preferably at approximately the same angle to each of the slide guide planes ESa, ESb, and particularly favorably approximately at right angles to the slide guide planes ESa, ESb.

Furthermore, as illustrated in FIG. 4, Z guide means are likewise provided on slide support sides 32b and 34b of the second support section 90, wherein the Z guide means 60o and 60u as well as 62o and 62u preferably extend from the slide support sides 32a and 34a of the first support section 40 continuously in longitudinal direction 18 of the machine base member 16 and thus likewise along the slide support sides 32b and 34b of the second support section 90, namely preferably from the first end 20 as far as the second end 22 of the machine base member 16.

In the area of the second support section 90, tool slides 110 and 112 are provided on the Z guide means 60o and 60u as well as 62o and 62u and these tool slides are guided on the Z guide means 60o and 60u as well as 62o and 62u by Z slide members 114 and 116 and, in addition, as illustrated in FIG. 5, have X guide members 124 and 126, on which X slide members 130 and 132 are guided in X direction, wherein the X direction extends at right angles to the second spindle axis 98.

In the area of the second support section 90, the slide guide planes ESa, ESb are therefore identical to those of the first support section 40.

In the case of the basic version of the first embodiment described thus far, the X guide members 64, 66, 124, 126 are securely connected to the Z slide members 54, 56, 114, 116.

In a version of the first embodiment which has been developed further it is provided for the X guide members 64, 66, 124, 126 to be arranged on Y slide members 65, 67, 125, 127 which, for their part, are guided on the Z slide members 54, 56, 114, 116 also designed as Y guide members so as to be movable in Y direction.

Since the second spindle axis 98 is aligned with the first spindle axis 48, the second spindle axis 98 is likewise located in the plane $E_1$.

Furthermore, in the same way as that explained in conjunction with the tool slides 50 and 52, tool carriers 134 and 136 are provided on the X slide members 130 and 132 and these are likewise preferably designed as turrets and thus likewise have the turret housing 78 and the turret head 82 rotatable about the turret axis 80.

In this respect, as illustrated in FIG. 5, the tools 84 held on the turret head 82 are likewise located in the plane $E_1$ insofar as they are in a working position A.

In a preferred embodiment of the first embodiment the respective turret axis 80 is arranged in the plane $E_1$ but at an angle α which is approximately 15° in relation to the respective spindle axis 48, 98, illustrated in FIG. 6 with the example of the first spindle axis 48. This solution has the advantage that the turret head 82 can be arranged in the turret housing 78 as close as possible to the spindle axis 48 but, in addition, the turret head 82 can also be driven by a drive 140 which is arranged coaxially to the spindle axis 80.

The drive 140 can preferably be designed such that it allows a rotatable drive of the turret head 82, on the one hand, for example, via an inner shaft 142 in order to bring the individual tools 84 into their working position A and, on the other hand, allows a drive of driven tools 84 in the turret head 82 via an outer shaft tube 144, for example, by means of a switchover device, wherein the inner shaft 142 and the outer shaft tube 144 are arranged coaxially to one another.

In the case of this alignment of the turret axis 80, tool receiving means 146 provided in the turret head 82, for example, in the form of insertion holes are preferably aligned such that their direction of insertion 148 is aligned at an angle β of 90°—α and thus the direction of insertion 148 always extends at right angles to the spindle axis 48 in the case of the tool 84A located in working position A.

As illustrated in FIGS. 3 and 5, the machine base member 16 is preferably designed such that it has a shape symmetrical to a plane of symmetry S, wherein the plane of symmetry S extends through the spindle axes 48 and 98.

Furthermore, the Z guide means 60 and 62 and the slide guide planes ESa, ESb are also preferably arranged symmetrically to the plane of symmetry S and thus the tool slides 50 and 52 as well as 110 and 112 are also guided symmetrically to the plane of symmetry S on the machine base member 16, namely not only on the first support section 40 but also on the second support section 90.

The first embodiment can be produced particularly inexpensively when it is designed such that the tool slides 50 and 52 as well as 110 and 112 are constructed so as to be in mirror symmetry to one another with respect to the plane of symmetry S, wherein the tool slides 50 and 112 as well as 52 and 110 are also of an identical design.

It is even more advantageous with respect to an inexpensive producibility when the tool carriers 74 and 76 as well as 134 and 136 are also designed to be in respective mirror symmetry to the plane of symmetry S and, in addition, the tool carriers 74 and 136 as well as 76 and 134 are of an identical construction.

This concept of the inventive machine tool allows all the rotationally symmetrical parts of the tool slides 50, 52, 110, 112 and the tool carriers 74, 76, 134, 136 to be designed as identical parts and all the remaining parts to likewise be designed as identical parts, at least insofar as they are used twice.

In addition, the inventive solution allows a high precision since the heat expansions during operation of the lathe have an effect in the same manner symmetrically to the plane of symmetry S and, furthermore, also have an effect in the same direction with respect to the position of the working spindles 44 and 94 relative to the machine base member 16 so that thermal effects impairing the precision during machining are reduced as far as possible on account of the constructional idea of the inventive lathe, in particular, the design of the machine base member 16 and the arrangement of the tool slides 50 and 52 as well as 110 and 112 on it.

Furthermore, the tool slides 50, 52 and 110, 112 and the tool carriers 74, 76 and 134, 136 will have essentially similar heat expansions on account of their construction which is in mirror symmetry in relation to the plane of symmetry S and identical crosswise so that as a result the precision during machining of workpieces W can also be increased.

A particularly simple and advantageous concept is thus realized with the inventive lathe, with which, as illustrated in FIG. 4, machining of the workpiece W held in the first workpiece receiving means 46 is possible on a first side 1S with the respective tool carriers 74 and 76 and following this machining on the side 1S of the workpiece W a transfer of the workpiece W from the first workpiece receiving means 46 into the second workpiece receiving means 96 can be realized by displacing the second working spindle 94 in Z direction in relation to the first working spindle 44, wherein the workpiece W is held on the machined side 1S by the second workpiece receiving means 96 and thus the second side 2S of the workpiece W can be machined, namely due to the fact that the second working spindle 96 returns again in Z direction to the second support section 90, in which a four-axis machining of the second side 2S of the workpiece W is possible by means of the tool carriers 134 and 136 while a four-axis machining of the side 1S of a new workpiece W can take place at the same time with the tool carriers 74 and 76.

The short constructional length of the inventive lathe in direction 18 of the machine base member 16 is particularly favorable since, in the case of the first working spindle 44, the first workpiece receiving means 46 is arranged on the side of the spindle housing 42 facing the second end 22 and, in the case of the tool carriers 74 and 76, the respective tools 84 are likewise arranged in the same way on the side facing the second end 22 and so during the machining of the first side 1S of the workpiece W not only the spindle housing 42 but also the tool carriers 74 and 76 are located on the same side when seen in the longitudinal direction 18 and with respect to the tools 84A located in working position A.

In the same way, in the case of the second working spindle 94 the second workpiece receiving means 96 is arranged so as to face the first end 20 and the tools 84 of the tool carriers 134 and 136 are likewise arranged so as to face the first end 20 so that, with respect to the tools 84A located in working position A, not only the spindle housing 92 but also the tool carriers 134 and 136 are likewise located on the same side.

As a result, in the case where the tool carriers 74 and 76 as well as 134 and 136 are designed as turrets, the turret heads 82 of all the tool carriers 74 and 134 or 76 and 136, respectively, arranged on the same slide support side 32 and 34, respectively, face one another and so the turret heads 82 can be positioned at a small distance from one another which is essentially determined only by the tools 84 used and their extension in the longitudinal direction 18.

Furthermore, the inclined arrangement of the turret axis 80 relative to the respective spindle axes 48 and 98 creates the possibility of being able to use tools 84I for internal machining in an advantageous manner since the tools 84 located opposite the working position A already have a greater distance from the turret housing 78 on account of the inclined position of the turret axis 80 and thus the distance between the turret head 82 and the turret housing 78 can be minimized.

Figure 8:
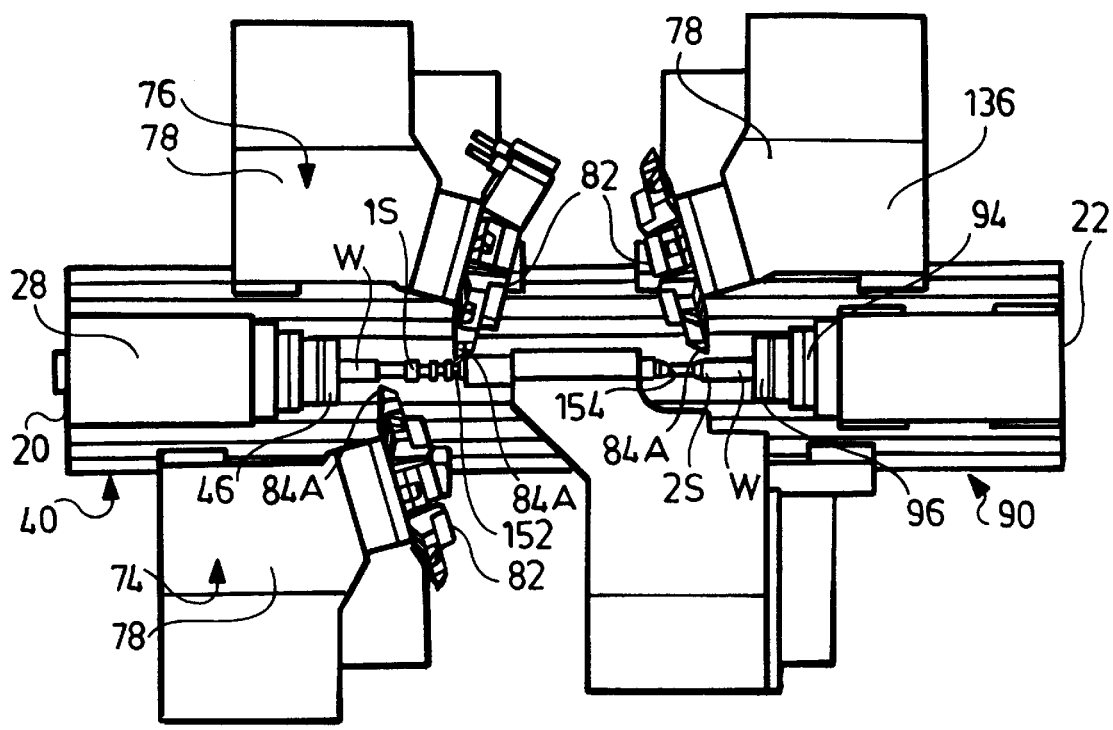
FIG. 8 shows a plan view similar to FIG. 4 of the second embodiment according to FIG. 7.
Figure 9:
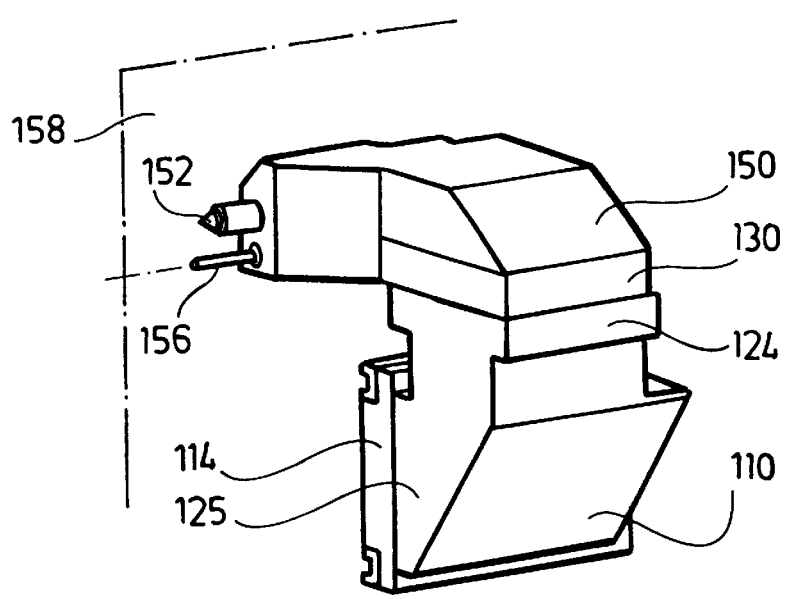
FIG. 9 shows a perspective view of the tool slide with the headstock of the second embodiment arranged on it.

In a second embodiment of an inventive lathe, illustrated in FIGS. 7 to 9, those parts which are identical to those of the first embodiment have been given the same reference numerals and so with respect to their description reference can be made in full to the comments on the first embodiment.

In contrast to the first embodiment, no tool carrier is arranged on the X slide member 130 of the tool slide 110 in the case of the second embodiment but rather a headstock comprising a headstock carrier 150 with, as illustrated in FIGS. 8 and 9, preferably two centers 152 and 154, wherein the center 152 is facing the first workpiece receiving means 46 and the center 154 the second workpiece receiving means 96.

It is possible with these centers 152 and 154 to support a workpiece W during the machining of the first side 1S, namely by the center 152, and a workpiece W during the machining of its side 2S, namely by the center 154, by moving these centers in a coaxial alignment to the spindle axes 48 and 98 and so the precision and/or speed during the machining of the sides 1S and 2S can be increased.

As a result of the displaceability of the headstock carrier 150 in X direction, the centers 152 and 154 can be moved out of the area between the workpiece receiving means 46 and 96 in order to thus be able to transfer the workpiece W from the first workpiece receiving means 46 to the second workpiece receiving means 96.

Furthermore, it is possible as a result of the displaceability of the headstock carrier 150 in the Z direction combined with the displaceability of the second working spindle 94 in the Z direction to bring the centers 152 and 154 into and out of engagement.

In the second embodiment, it is not absolutely necessary to design the tool slide 110 identically to the remaining tool slides 50, 52 and 112; it is, however, also possible to construct the tool slide 110 identically in this case.

However, in the case of the tool slide 110, in particular, the X guide member 124 is arranged on the Y slide 125 which, for its part, can be moved in Y direction in relation to the Z slide member 114.

As a result, it is possible to use the headstock carrier as an element carrier 150 and, for example, provide in addition to the centers 152 and 154 a deep hole boring unit 156 or alternatively thereto a multiple-sided turning device or similar tools which can be brought into engagement due to displacement of the element carrier 150 in Y direction, wherein not only the centers 152 and 154 but also the additional tools, such as, for example, the deep hole boring unit 156, are preferably located with their central axes in a plane 158 parallel to the Y direction so that only a movement of the element carrier 150 in Y direction is necessary in order to change between the individual possibilities.

Moreover, this solution has the advantage that when using the centers 152, 154 or when using the additional tool 156 the additional tool 156 and the centers 152, 154, respectively, are in a position beneath or above the workpiece to be machined in the plane 158 extending through the respective spindle axis and thus the risk of collision with the tools 84 is minimized.

In a third embodiment of an inventive lathe, illustrated in FIG. 10, those parts which are identical to those of the first embodiment are likewise given the same reference numerals and so with respect to their description reference can be made in full to the comments on the preceding embodiments.

In contrast to the preceding embodiments, the tool carriers 74, 76, 134 and 136 designed as turrets are provided in the case of the third embodiment with a turret axis 80' extending parallel to the respective spindle axes 48 and 98.

Figure 11:
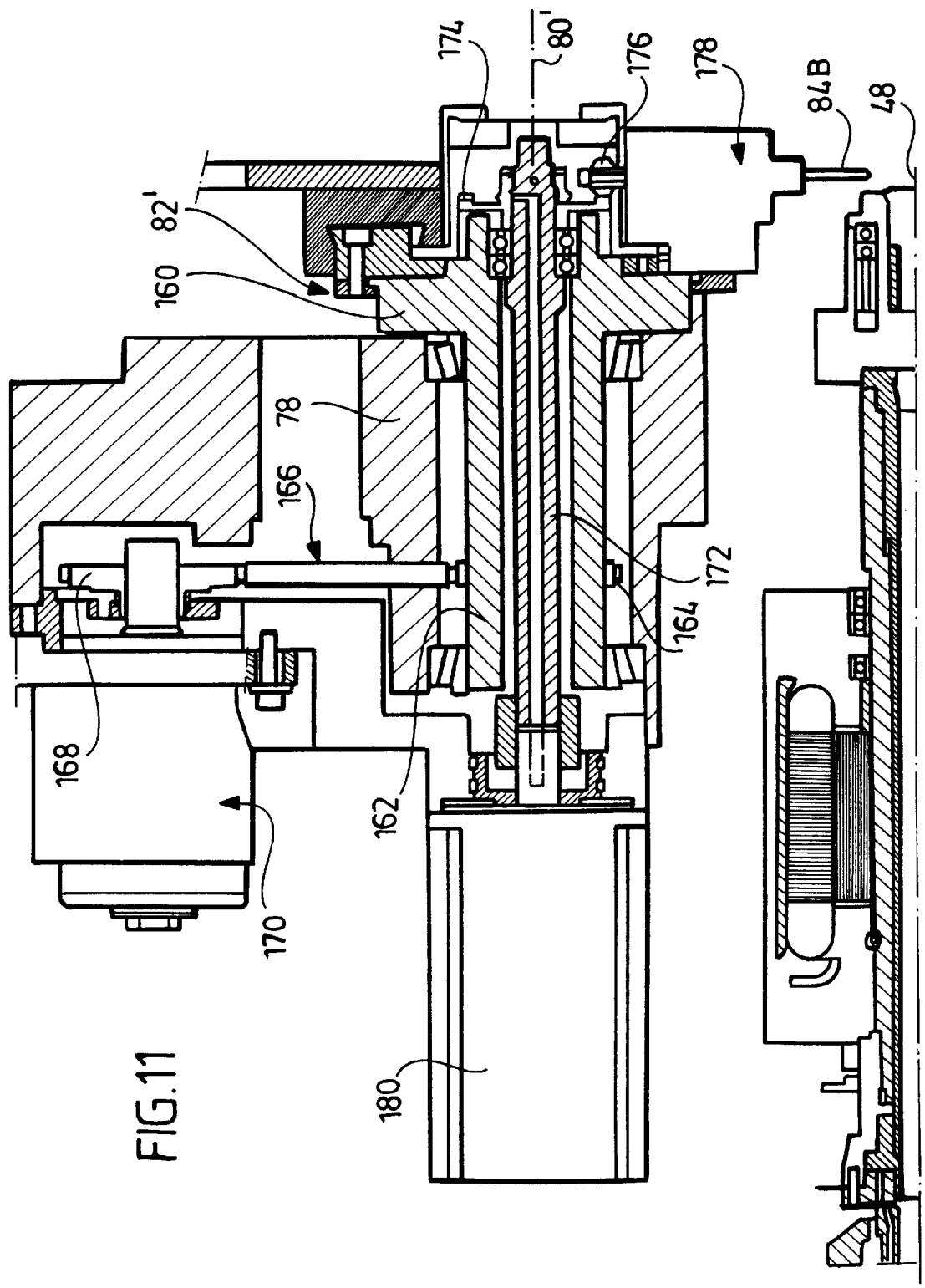
FIG. 11 shows a section similar to FIG. 6 through the third embodiment according to FIG. 10.

In this embodiment, as illustrated in FIG. 11, the turret head 82 is designed as a head of a disc turret 160, as described in the patent application PCT/EP00/03718.

The turret head 160 is rotatably mounted in the turret housing 78 by means of a hollow shaft 162, wherein the hollow shaft 162 bears external teeth 164, with which a gear wheel 166 engages which, for its part, can be driven via a drive pinion 168 of a rotary drive of the turret head 160 which is designated as a whole as 170 in order to be able to bring the individual tools 84 into working position A.

Moreover, a drive shaft 172 is mounted in the hollow shaft 162 and this bears a toothed wheel 174 which is provided in the turret head, has radial teeth and serves to drive a drive pinion 176 of a drivable tool holder 178, into which a drill 84b is inserted, for example, as tool.

The drive shaft 172 extends coaxially to the hollow shaft 162 through it and can be driven by a drive 180 which is arranged coaxially to the drive shaft 172 and thus to the turret axis 80', as well.

Figure 13:
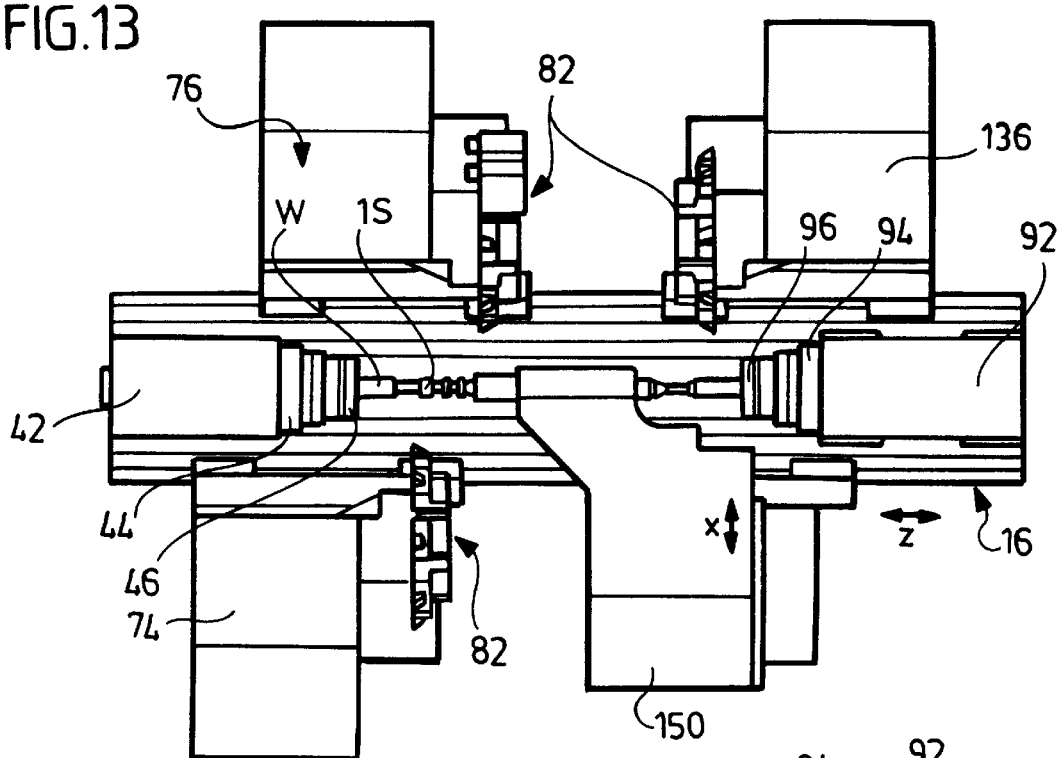
FIG. 13 shows a plan view of the fourth embodiment of the inventive lathe.

In a fourth embodiment, illustrated in FIGS. 12 and 13, those elements which are identical to those of the preceding embodiments are given the same reference numerals and so in this respect reference can be made in full to the preceding embodiments.

The fourth embodiment represents a modification of the third embodiment insofar as one of the tool carriers, namely the tool carrier 134, is replaced in the same way as in the second embodiment by a headstock carrier 150 which can likewise be moved in X and Z directions in the same way as in the second embodiment and can be used for supporting the workpieces W for the machining in the first workpiece receiving means 46 and the second workpiece receiving means 96, respectively, in accordance with the comments on the second embodiment.

Figure 14:
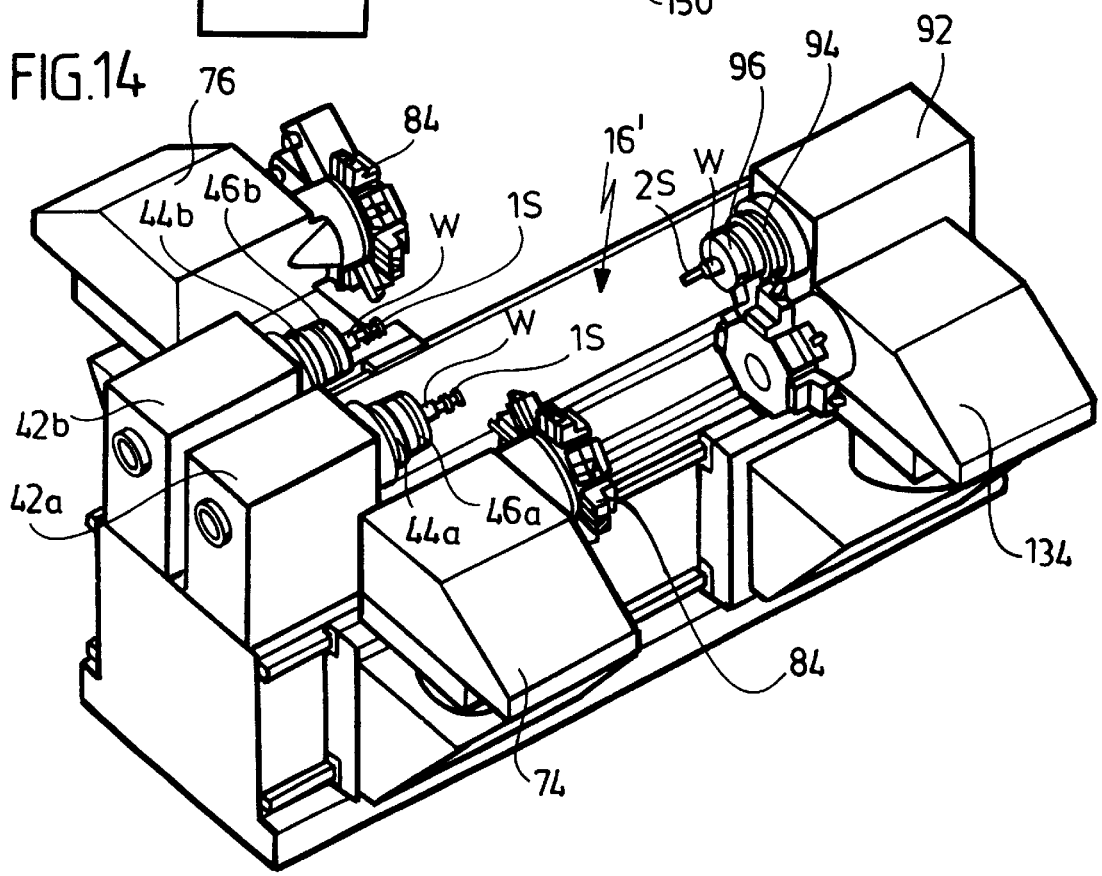
FIG. 14 shows a perspective overall view of a fifth embodiment of an inventive lathe.

In a fifth embodiment, illustrated in FIG. 14, those elements which are identical to those of the preceding embodiments are given the same reference numerals and so reference can be made in full to them.

In contrast to the third embodiment, the machine base member 16' is of a broader construction so that two first spindle housings 42a and 42b can be used in the second transverse direction 30 next to one another, these spindle housings being required, for example, when different complex operating steps are required at the first side 1S of the workpiece W and so the tools 84 of the tool carrier 76 machine the first side of the workpiece W when the workpiece W is held in the workpiece receiving means 46b whereas a machining of the first side of the workpiece W with the tools 84 of the tool carrier 74 takes place when the workpiece W is held in the first workpiece receiving means 46a of the first working spindle 44a.

As for the rest, the second working spindle 94 with the second workpiece receiving means 96 is provided in alignment with the first working spindle 44a, in the same way as that described in the preceding embodiments, the spindle housing 92 of the second working spindle likewise being displaceable in Z direction in the manner described in order to take over the workpiece W, for example, from the first workpiece receiving means 46a and machine the workpiece W on the second side 2S, wherein, in this case, only the tool carrier 134 is provided for this purpose.

However, it is also conceivable to provide, in addition, the tool carrier 136 which must, however, be designed in the second transverse direction 30 on account of the broader design of the machine base member 16 such that its tools can likewise still reach the workpiece W in the second workpiece receiving means 96.

The transfer of the workpiece W from the workpiece receiving means 46b of the first working spindle 44b to the second working spindle 44a is brought about, for example, with an external workpiece handling means provided for this purpose.

However, additional modifications of the fifth embodiment are also conceivable.

For example, it would be possible to mount the second workpiece spindle 94 on the machine base member 16 so as to be movable, in addition, in X direction in order to be able to remove the workpiece not only from the working spindle 44a but also from the working spindle 44b.

In a sixth embodiment of an inventive lathe, illustrated in FIGS. 15 to 17, the machine base member 16' likewise comprises the first support section 40 and the second support section 90. In contrast to the machine base member 16, a connecting section 180 with an altered cross section is, however, provided between the first support section 40 and the second support section 90 and this connecting section is preferably broadened in the second transverse direction 30 in comparison with the support sections 40 and 90 but is reduced in size in the first transverse direction 26 in the direction of the base side 24 so that an upper side 182 located opposite the base side 24 is set back in the direction of the base side 24 in comparison with the spindle support sides 28a and 28b in order to create more space in a working space AR located above the upper side 182.

Furthermore, in the sixth embodiment the first working spindle 44 with its first spindle housing 42 is held on the spindle support side 28a so as to be displaceable in Z direction. For this purpose, guide members 184l and 184r are provided on the spindle support side 28a which define a spindle guide plane ESP' and in which longitudinal guide means 186l and 186r are guided so as to be displaceable in the Z direction, wherein these longitudinal guide means 186l and 186r are held on the first spindle housing 42.

Furthermore, a recess 190 is integrally formed in the spindle support side 28a and this serves to accommodate a feed spindle 192 and partially to accommodate a feed drive 194 which drives the feed spindle 192 and extends, for example, beyond the first end 20 of the machine base member 16 in the longitudinal direction 18.

Furthermore, a flange 196 extending transversely through the recess 190 is integrally formed therein and the feed drive 194 can be mounted on this flange.

In addition, as illustrated in FIGS. 15 and 16, the second working spindle 94 is also guided on the second support section 90 so as to be displaceable in Z direction, wherein, in this case, the same elements are used as those described in conjunction with the preceding embodiments.

The spindle support side 28b of the second support section is also provided with a recess 200 which serves to accommodate a feed spindle 202 which can be driven by a feed drive 204. In this respect, a spindle nut 206 is seated directly on the second spindle housing 92 of the second working spindle 94 and, in addition, the feed drive 204 is fixed on the second support section 90 of the machine base member 16 in the same way as the feed drive 194.

In addition to the second spindle housing 92 of the second working spindle 94 which is displaceable in Z direction, a guiding device 210 is also provided on the spindle support side 28b of the second support section 90 for the longitudinal turning of a workpiece W accommodated in the second workpiece receiving means 96 of the second working spindle 94, wherein the guiding device 210 comprises, for example, a guide bushing 212 which guides the workpiece W precisely on its circumferential side and is mounted with a guide bushing holder 214 on the spindle support side 28 of the second support section 90.

The guide bushing 212 guides the workpiece W held in the second workpiece receiving means 96 of the second working spindle 94 such that a machining side BS projecting beyond this guide bushing 212 into the working space AR is guided coaxially to the second spindle axis 98 whereas the length of the side BS projecting beyond the guide bushing 212 can be predetermined by displacing the second working spindle 94 in Z direction.

In order to be able to remove the workpiece W, which has been machined by way of longitudinal turning by means of the guiding device 210, from the workpiece receiving means 96 of the second working spindle 94 for the purpose of machining the second side 2S, the first working spindle 44 can be displaced in the Z direction as far as the guiding device 210 so that the first workpiece receiving means 46 can take over the workpiece W in the area of the side BS as close as possible to the guide bushing 212 and therefore withdraw it from the second workpiece receiving means 96. Subsequently, the first working spindle 44 is then moved away from the guiding device 210 again, namely to such an extent that the first working spindle 44 is essentially located above the first support section 40.

In order to machine the workpiece W, a tool slide designated as a whole as 220 is held, for example, as illustrated in FIG. 18, on the slide support side 34a of the first support section 40.

The tool slide 220 comprises a Y slide member 224 which is guided relative to the machine base member 16 in Y direction, i.e. at right angles to the X direction and, in addition, transversely to the respective spindle axis, i.e. to the first spindle axis 48, on Y guide means 230 which define a slide guide plane ES' extending transversely to the spindle guide plane ESP'.

The Y slide member 224 bears, for its part, a Z guide member 234 with Z guide means 238 which extend in Z direction and on which a Z slide member 244 is guided which, for its part, bears an X guide member 250, on which an X slide member 254 displaceable in X direction is guided.

A tool carrier designated as a whole as 264 is held on this X slide member and can be designed, for example, in the same way as the tool carrier 74 as a tool turret with the turret housing 78 and the turret head 82, wherein in the case of the embodiment illustrated in the drawings the turret axis 80' extends parallel to the first spindle axis 48 but can also extend at an angle to this, as illustrated in conjunction with the first embodiment.

Furthermore, a tool slide 272 is provided in the area of the second support section 90 on the slide support side 32b and comprises a Y slide member 276 which, for its part, is guided on Y guide means 282 which extend transversely to the spindle guide plane ESP, define a slide guide plane ES" and are fixed on the slide support side 32b of the machine base member 16' (FIG. 19).

Furthermore, the Y slide member 276 bears a Z guide member 286 which bears Z guide means 290.

A Z slide member 296 is guided on the Z guide means 290 so as to be displaceable in Z direction, this slide member, for its part, bearing an X guide member 302, on which an X slide member 306 is again guided so as to be displaceable in X direction.

A tool carrier which is designated as a whole as 316 is seated on the X slide member and can be designed in the same way as that described in conjunction with the preceding embodiments.

With these two tool carriers 316 and 264 it is possible, on the one hand, to machine the workpiece W on the side BS, wherein the tool carrier 316 is used and preferably controlled such that the tools 84 thereof always work as close as possible to the guide bushing 212 of the guiding device 210 in order to achieve as high a precision as possible.

In principle, it would not be necessary during the machining of the workpiece W on the side BS, which projects beyond the guide bushing 212 in the direction of the first support section 40, to provide a Z displaceability of the tool carrier 316, as is realized with the tool slide 272, but the Z movability of the tool carrier 316 has the great advantage that, as a result, the workpiece W can always be machined such that it is merely advanced by the second working spindle 94 in the direction of the first working spindle 44 through the guide bushing 212 but need not be withdrawn during any machining, whereby the exactness of machining on the side BS of the workpiece W can be considerably increased.

All the movements, during which the side BS of the workpiece W with a machined area must normally be drawn back into the guide bushing 212, may be shifted to the Z movability of the tool carrier 316, realized by the tool slide 272.

In the same way, the tool slide 220 also creates the possibility of machining the workpiece W on the side 2S, as well, in an optimum manner on account of the Z movability of the tool carrier 264, wherein the Z movability of the tool carrier 264 would likewise not be necessary, in principle, on account of the Z movability of the first working spindle 44 but has proven its worth during complex machinings.

Furthermore, the Y axis is preferably shifted in the case of the tool slides 220 and 272 into the area of the fixing of the entire tool slide 220, 272 on the machine base member 16 in the area of the slide support sides 34a and 32b since the Y movement needs to have the lowest dynamics during the machining of a workpiece and thus the high-dynamic movements, namely the movement in Z direction and the movement in X direction, can take place with a mass to be accelerated which is as low as possible.

Moreover, in this embodiment of the inventive lathe a slight distance in Z direction is, in any case, required and so the movability in Z direction can be integrated into the tool slides 220 and 272 in a space-saving manner.

Figure 20:
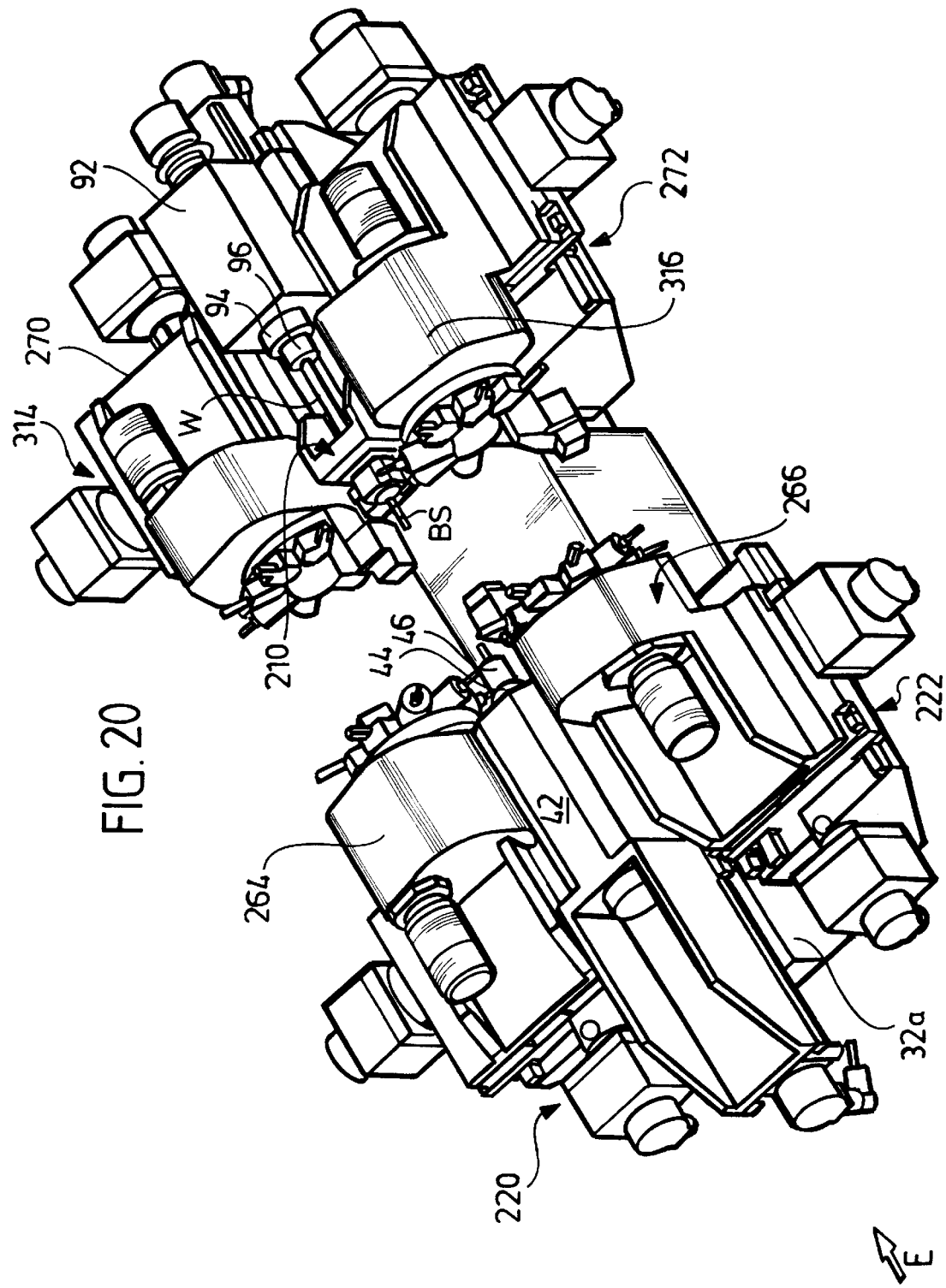
FIG. 20 shows a perspective overall view of a seventh embodiment of an inventive lathe.
Figure 21:
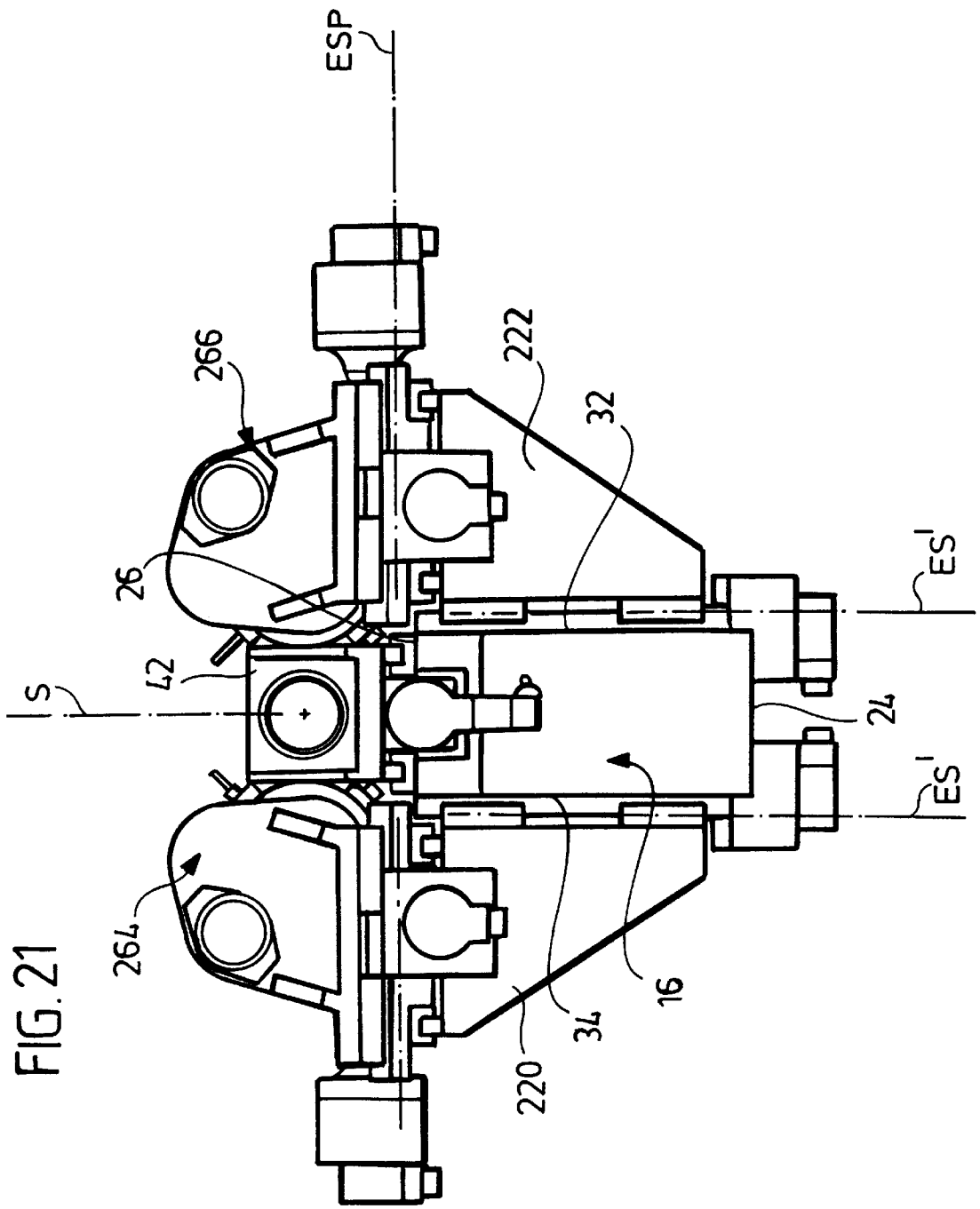
FIG. 21 shows a plan view in the direction of arrow E in FIG. 20.

In a seventh embodiment, illustrated in FIG. 20 and FIG. 21, the basic concept is based on that of the sixth embodiment and so reference can be made in full to the explanations concerning the sixth embodiment insofar as the same parts are used. However, in addition to the tool carriers 264 and 316 further tool carriers 314 and 266 are provided which are respectively arranged on the oppositely located slide support sides 32a and 34b.

As a result, a concept such as that already explained in conjunction with the first embodiment is present but the guiding device 210 for longitudinal turning is available, in addition, and at the same time the first working spindle 44 is also displaceable in Z direction.

In this respect, the tool carriers 264 and 266 as well as 314 and 316 as well as the tool slides 220 and 222 as well as 270 and 272 are each designed to be symmetric to the plane of symmetry S in the same way as that explained in conjunction with the first embodiment or the third embodiment and, in addition, the tool slides 220 and 272 as well as 222 and 270 are of an identical design. The same applies for the tool carriers 264 and 316 as well as 266 and 314.

As a result, it is possible, analogously to the first or third embodiments, to machine the side BS of the workpiece W with the tools 84 of the tool carriers 314 and 316 and to machine the side 2S of the workpiece W with the tools 84 of the tool carriers 264 and 266 after the workpiece W has been transferred from the workpiece receiving means 96 of the second working spindle 94 to the first workpiece receiving means 46 of the first working spindle 44, wherein the Z movability provided in the tool slides 220 and 222 as well as 270 and 272 for the tool carriers 264 and 266 as well as 314 and 316 for the independent operation of the tools 84 of each of the tool carriers 264 and 266 as well as 314 and 316 has proven to be advantageous and, in addition, the Y movability of the tool slides 220 and 222 as well as 270 and 272 can be used advantageously in order to carry out customary machinings with the tools 84 of each of the tool carriers 264 and 266 as well as 314 and 316 with the use of a Y axis.

Figure 22:
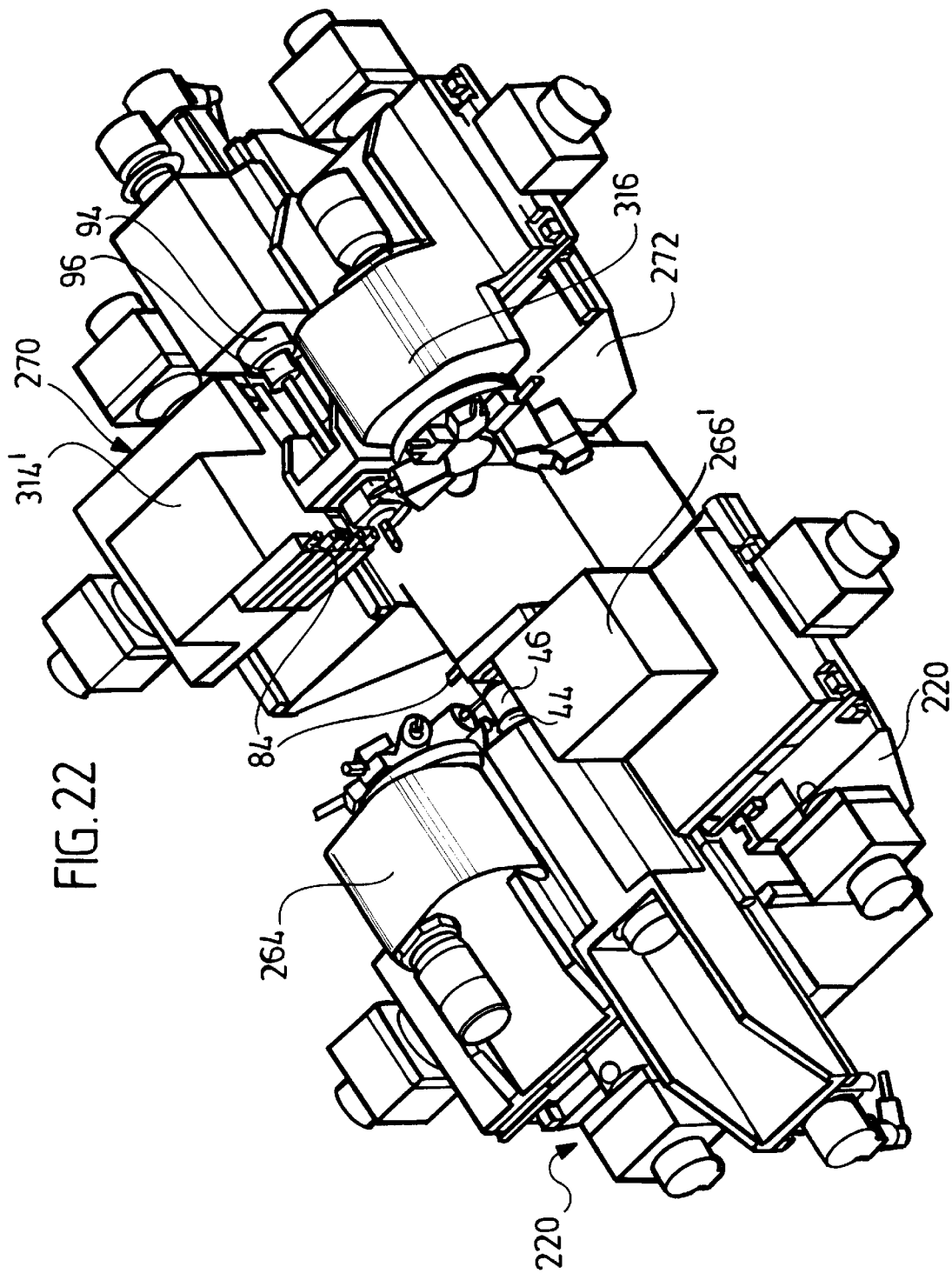
FIG. 22 shows a schematic illustration of an eighth embodiment of an inventive lathe, with which in contrast to the seventh embodiment two tool carriers are designed as linear tool carriers.

In an eighth embodiment, illustrated in FIG. 22, a similar concept is realized to that in the seventh embodiment, illustrated in FIGS. 20 and 21, but with the difference that no tool carriers 266 and 314 are seated on the tool slides 222 and 270 but rather linear tool carriers 266' and 314' which, for their part, can again be of an identical design to one another but are not designed as turrets but rather have tools 84 for the machining which are arranged in a row next to one another.

Linear tool carriers of this type can be advantageously used when fewer tools are to be used.

In the eighth embodiment, as well, the arrangement is, however, selected even when the linear tool carriers 266' and 314' are used such that the tool slides 220, 222, 270, 272 and essentially also the tool carriers 264, 266', 312, 314' bear the tools 84 on the side facing the oppositely located working spindle 94 and 44, respectively, so that the tool carriers 266' and 314' themselves are also located, with respect to the tool to be brought into engagement, on the same side as the workpiece receiving means 46 and 96, respectively, of the respective working spindle 44 or 94.

In a variation of the sixth, seventh and eighth embodiments it is also conceivable to omit the guiding device 210 and operate in the manner of a "short traveler" in accordance with the first to fifth embodiments.

What is claimed is:

1. Lathe, comprising:
a machine frame arranged on a support surface and having a base frame and a machine base member suspended on said base frame, the machine base member being elongated in a longitudinal direction, the machine base member having a first support section and a second support section arranged to follow this in the longitudinal direction, each of the support sections extending from a base side, a spindle support side located opposite said base side in a first transverse direction in relation to the longitudinal direction, said spindle support side extending in a plane essentially parallel to a plane defined by said base side, and two slide support sides located opposite one another in a second transverse direction in relation to the longitudinal direction, said second transverse direction extending perpendicular to said first transverse direction, and said slide support sides being located between the base side and the spindle support side, a first working spindle with a first workpiece receiving means, said spindle being arranged on the machine frame and drivable for rotation about a first spindle axis, the first working spindle being supported on the spindle support side of the first support section, at least one first tool slide for displacing a tool carrier in an X direction transversely to the first spindle axis so that a workpiece held in the first workpiece receiving means is machinable with at least one tool held on the tool carrier, the first tool slide being mounted for movement in a Z direction essentially parallel to said first spindle axis on one of the slide support sides of the first support section, such that the first tool slide is essentially entirely supported by the corresponding one of the slide support sides, a second working spindle with a second workpiece receiving means facing the first workpiece receiving means, said second spindle being arranged on the machine frame and drivable for rotation about a second spindle axis, the second working spindle being supported on the spindle support side of the second support section, at least one second tool slide for displacing a tool carrier in an X direction transversely to the second spindle axis so that a workpiece held in the second workpiece receiving means is machinable with at least one tool held on the tool carrier, the second tool slide being mounted for movement in a Z direction essentially parallel to said second spindle axis on one of the slide support sides of the second support section, such that the second tool slide is essentially entirely supported by the corresponding one of the slide support sides.

2. Lathe as defined in claim 1, wherein the support sections have essentially the same cross section.

3. Lathe as defined in claim 2, wherein the machine base member extends with a beam-like shape in the longitudinal direction.

4. Lathe as defined in claim 1, wherein a connecting section is provided between the support sections.

5. Lathe as defined in claim 4, wherein the connecting section has a cross-sectional shape different from the support sections.

6. Lathe as defined in claim 1, wherein at least one of the support sections has on its spindle support side guide means for a working spindle displaceable in the Z direction essentially parallel to the respective spindle axis, said guide means being located in a spindle guide plane.

7. Lathe as defined in claim 6, wherein the guide means are located in a spindle guide plane extending essentially parallel to the longitudinal direction.

8. Lathe as defined in claim 6, wherein a slide guide plane extends transversely to the spindle guide plane.

9. Lathe as defined in claim 8, wherein the slide guide planes located opposite one another extend transversely to the spindle guide plane.

10. Lathe as defined in claim 9, wherein the slide guide planes extend approximately at right angles to the spindle guide plane.

11. Lathe as defined in claim 1, wherein at least one of the tool slides is guided so as to be movable on the machine base member with slide guide means located in a slide guide plane.

12. Lathe as defined in claim 11, wherein the slide guide means extend in slide guide planes extending essentially parallel to the longitudinal direction.

13. Lathe as defined in claim 1, wherein the slide support sides of the machine base member are located on the same side of the spindle guide plane.

14. Lathe as defined in claim 1, wherein for the machining of the respective workpiece the corresponding tool slide and the corresponding working spindle are arranged on the same side of the respective tool located in working position in relation to this workpiece.

15. Lathe as defined in claim 1, wherein all the tool slides usable for the machining of the workpiece held in one of the workpiece receiving means are arranged, when seen in longitudinal direction of the machine base member, essentially on the same side of the tools borne by the tool slides when the tools are brought into working position.

16. Lathe as defined in claim 1, wherein the tool slides associated with the respective support section are arranged on a side of the tools borne by them facing away from the respectively other support section.

17. Lathe as defined in claim 1, wherein two tool slides are associated with at least one support section.

18. Lathe as defined in claim 17, wherein at least one of the two tool slides associated with one of the working spindles has a slide member movable in Z direction.

19. Lathe as defined in claim 1, wherein the tool slides on at least one of the support sections are designed to be in mirror symmetry to a mirror plane.

20. Lathe as defined in claim 1, wherein a tool slide of the one support section is of an identical design to a tool slide of the other support section.

21. Lathe as defined in claim 19, wherein the tool slides designed to be identical to one another are arranged on different slide support sides of the machine base member.

22. Lathe as defined in claim 1, wherein the slide guide means for the at least one tool slide are respectively provided in the area of the support sections on the slide support sides.

23. Lathe as defined in claim 22, wherein the slide guide means are arranged outside a longitudinal section of the machine base member having a working space located in it.

24. Lathe as defined in claim 1, wherein the tool slides are separate and independent from one another.

25. Lathe as defined in claim 1, wherein Z guide means for movable guidance of the respective tool slide are provided on at least one slide support side.

26. Lathe as defined in claim 25, wherein the Z guide means of the slide support side of one support section are aligned with Z guide means of the same slide support side of the other support section.

27. Lathe as defined in claim 26, wherein the Z guide means of the slide support sides of both support sections merge into one another.

28. Lathe as defined in claim 27, wherein the Z guide means extend beyond a connecting section.

29. Lathe as defined in claim 1, wherein at least one of the tool slides comprises a Y slide member guided on the slide support side of the machine base member so as to be movable in Y direction.

30. Lathe as defined in claim 29, wherein at least one of the tool slides comprises a Z slide member movable in Z direction in relation to the Y slide member guided on the slide support side.

31. Lathe as defined in claim 1, wherein Y guide means for movable guidance of the respective tool slide are provided on at least one slide support side.

32. Lathe as defined in claim 1, wherein each tool slide comprises an X slide member guided for movement in X direction in relation to a slide member guided on the slide support side.

33. Lathe as defined in claim 1, wherein for the machining of the respective workpiece the corresponding tool carrier and the corresponding workpiece receiving means are, when seen in longitudinal direction of the machine base member, arranged essentially on the same side of the respective tool located in working position in relation to this workpiece.

34. Lathe as defined in claim 1, wherein all the tool carriers usable for the machining of the workpiece held in one of the workpiece receiving means are, when seen in longitudinal direction of the machine base member, arranged essentially on the same side of the tools adapted to be brought into working position.

35. Lathe as defined in claim 1, wherein the tool carriers associated with the respective support section extend essentially in the direction of a side of the respective tools borne by them facing away from the respectively other support section.

36. Lathe as defined in claim 1, wherein two tool carriers are associated with at least one of the working spindles.

37. Lathe as defined in claim 36, wherein the tool carriers on at least one of the support sections are designed to be in mirror symmetry to a mirror plane.

38. Lathe as defined in claim 1, wherein a tool carrier of the one support section is of an identical design to the tool carrier of the other support section.

39. Lathe as defined in claim 38, wherein the tool carriers of an identical design to one another are arranged on different slide support sides of the machine base member.

40. Lathe as defined in claim 1, wherein the tool carriers are designed as multiple tool carriers.

41. Lathe as defined in claim 40, wherein at least one of the tool carriers is designed as a tool turret.

42. Lathe as defined in claim 41, wherein the tool turret has a turret axis extending at an angle of less than 45° to the respective spindle axis.

43. Lathe as defined in claim 42, wherein the turret axis extends essentially parallel to the respective spindle axis.

44. Lathe as defined in claim 41, wherein the tool turret has a turret axis extending in an angular range of approximately 10° to approximately 30° in relation to the respective spindle axis.

45. Lathe as defined in claim 1, wherein one of the tool slides bears an element carrier for elements usable on the workpiece.

46. Lathe as defined in claim 45, wherein the element carrier bears a workpiece support element as element.

47. Lathe as defined in claim 46, wherein the workpiece support element is a receiving means for supporting the workpiece.

48. Lathe as defined in claim 45, wherein the element carrier bears a tool as element.

49. Lathe as defined in claim 45, wherein the elements are located with their central axis in a plane.

50. Lathe as defined in claim 49, wherein the plane extends essentially parallel to the Y axis.

51. Lathe as defined in claim 1, wherein at least one of the working spindles is displaceable in Z direction to such an extent in the direction of the other working spindle that the workpiece is transferable from one workpiece receiving means to the other workpiece receiving means.

52. Lathe as defined in claim 1, wherein guide means for the working spindle displaceable in Z direction are respectively arranged in the area of the support sections.

53. Lathe as defined in claim 52, wherein the guide means are arranged outside a longitudinal section of the machine base member having a working space located in it.

54. Lathe as defined in claim 1, wherein a guiding device for longitudinal turning is associated with one of the working spindles.

55. Lathe as defined in claim 54, wherein the working spindle is movable in Z direction relative to the guiding device.

56. Lathe as defined in claim 54, wherein the working spindle is guided on a Z guide means arranged on the spindle support side of the support section.

57. Lathe as defined in claim 54, wherein the guiding device is held stationary on the support section.

58. Lathe as defined in claim 54, wherein the oppositely located working spindle is movable in Z direction relative to the support section.

59. Lathe as defined in claim 58, wherein the oppositely located working spindle is displaceable in Z direction to such an extent that its workpiece receiving means reaches the guiding device.

60. Lathe, comprising:

a machine frame arranged on a support surface and having a machine base member elongated in a longitudinal direction, the machine base member having a first support section and a second support section arranged to follow this in the longitudinal direction, each of the support sections extending from a base side, a spindle support side located opposite said base side in a first transverse direction in relation to the longitudinal direction, said first transverse direction extending at right angles to said spindle support side and intersecting said base side, and two slide support sides located opposite one another in a second transverse direction in relation to the longitudinal direction, said second transverse direction extending perpendicular to said first transverse direction, and said slide support sides being located within the volume defined by lateral edges of the base side and lateral edges of the spindle support side, a first working spindle with a first workpiece receiving means, said spindle being arranged on the machine frame and drivable for rotation about a first spindle axis, the first working spindle being supported on the spindle support side of the first support section, at least one first tool slide for displacing a tool carrier in an X direction transversely to the first spindle axis so that a workpiece held in the first workpiece receiving means is machinable with at least one tool held on the tool carrier, the first tool slide being mounted for movement in a Z direction essentially parallel to said first spindle axis on one of the slide support sides of the first support section, such that the first tool slide is essentially entirely supported by the corresponding one of the slide support sides, a second working spindle with a second workpiece receiving means facing the first workpiece receiving means, said second spindle being arranged on the machine frame and drivable for rotation about a second spindle axis, the second working spindle being supported on the spindle support side of the second support section, at least one second tool slide for displacing a tool carrier in an X direction transversely to the second spindle axis so that a workpiece held in the second workpiece receiving means is machinable with at least one tool held on the tool carrier, the second tool slide being mounted for movement in a Z direction essentially parallel to said second spindle axis on one of the slide support sides of the second support section, such that the second tool slide is essentially entirely supported by the corresponding one of the slide support sides.

61. Lathe, comprising:

a machine frame arranged on a support surface and having a machine base member elongated in a longitudinal direction, the machine base member having a first support section and a second support section arranged to follow this in the longitudinal direction, each of the support sections having four external sides comprising a base side extending in a plane essentially parallel to a plane of a spindle support side located opposite said base side in a first transverse direction in relation to the longitudinal direction, and two slide support sides located opposite one another in a second transverse direction in relation to the longitudinal direction, said second transverse direction extending perpendicular to said first transverse direction, and said slide support sides being located between the base side and the spindle support side, a first working spindle with a first workpiece receiving means, said spindle being arranged on the machine frame and drivable for rotation about a first spindle axis, the first working spindle being supported on the spindle support side of the first support section, at least one first tool slide for displacing a tool carrier in an X direction transversely to the first spindle axis so that a workpiece held in the first workpiece receiving means is machinable with at least one tool held on the tool carrier, the first tool slide being mounted for movement in a Z direction essentially parallel to said first spindle axis on one of the slide support sides of the first support section, such that the first tool slide is essentially entirely supported by the corresponding one of the slide support sides, a second working spindle with a second workpiece receiving means facing the first workpiece receiving means, said second spindle being arranged on the machine frame and drivable for rotation about a second spindle axis, the second working spindle being supported on the spindle support side of the second support section, at least one second tool slide for displacing a tool carrier in an X direction transversely to the second spindle axis so that a workpiece held in the second workpiece receiving means is machinable with at least one tool held on the tool carrier, the second tool slide being mounted for movement in a Z direction essentially parallel to said second spindle axis on one of the slide support sides of the second support section, such that the second tool slide is essentially entirely supported by the corresponding one of the slide support sides.

62. Lathe, comprising:

a machine frame arranged on a support surface and having a machine base member elongated in a longitudinal direction, the machine base member having a first support section and a second support section arranged to follow this in the longitudinal direction, each of the support sections extending from a base side, a spindle support side located in a plane opposite and essentially parallel to a plane of said base side in a first transverse direction in relation to the longitudinal direction, and two slide support sides located opposite one another in a second transverse direction in relation to the longitudinal direction, said machine base member being designed to have a plane of mirror symmetry extending transverse to said base side and said spindle support side, and said slide support sides being located between the base side and the spindle support side, a first working spindle with a first workpiece receiving means, said spindle being arranged on the machine frame and drivable for rotation about a first spindle axis, the first working spindle being supported on the spindle support side of the first support section, at least one first tool slide for displacing a tool carrier in an X direction transversely to the first spindle axis so that a workpiece held in the first workpiece receiving means is machinable with at least one tool held on the tool carrier, the first tool slide being mounted for movement in a Z direction essentially parallel to said first spindle axis on one of the slide support sides of the first support section, such that the first tool slide is essentially entirely supported by the corresponding one of the slide support sides a second working spindle with a second workpiece receiving means facing the first workpiece receiving means, said second spindle being arranged on the machine frame and drivable for rotation about a second spindle axis, the second working spindle being supported on the spindle support side of the second support section, at least one second tool slide for displacing a tool carrier in an X direction transversely to the second spindle axis so that a workpiece held in the second workpiece receiving means is machinable with at least one tool held on the tool carrier, the second tool slide being mounted for movement in a Z direction essentially parallel to said second spindle axis on one of the slide support sides of the second support section, such that the second tool slide is essentially entirely supported by the corresponding one of the slide support sides.

63. Lathe, comprising:

a machine frame arranged on a support surface and having a machine base member elongated in a longitudinal direction, the machine base member having at least one support section, said at least one support section having a base side, a spindle support side located opposite said base side in a first transverse direction in relation to the longitudinal direction, said base side and spindle support side residing in respective spaced, essentially parallel planes, and two slide support sides located opposite one another in a second transverse direction in relation to the longitudinal direction, said machine base member being designed to have a plane of mirror symmetry extending transverse to said base side and said spindle support side, and said slide support sides being located between the base side and the spindle support side, a first working spindle with a first workpiece receiving means, said spindle being arranged on the machine frame and drivable for rotation about a first spindle axis, the first working spindle being supported on the spindle support side of the at least one support section, at least one first tool slide for displacing a tool carrier in an X direction transversely to the first spindle axis so that a workpiece held in the first workpiece receiving means is machinable with at least one tool held on the tool carrier, the first tool slide being mounted for movement in a Z direction essentially parallel to said first spindle axis on one of the slide support sides of the at least one support section, such that the first tool slide is essentially entirely supported by the corresponding one of the slide support sides, at least one second tool slide for a tool carrier, the second tool slide being mounted for movement in a Z direction essentially parallel to said first spindle axis on the other slide support side of the at least one support section, such that the second tool slide is essentially entirely supported by said other slide support side.

* * * * *

UNITED STATES PATENT AND TRADEMARK OFFICE
CERTIFICATE OF CORRECTION

PATENT NO.   : 6,758,117 B2
DATED        : July 6, 2004
INVENTOR(S)  : Baumann et al.

It is certified that error appears in the above-identified patent and that said Letters Patent is hereby corrected as shown below:

Column 21,
Line 27, after the word "claim", change "19" to -- 20 --

Signed and Sealed this

Thirty-first Day of August, 2004

JON W. DUDAS
*Director of the United States Patent and Trademark Office*